(12) United States Patent
Fagerstrom et al.

(10) Patent No.: US 9,683,277 B2
(45) Date of Patent: Jun. 20, 2017

(54) PROCESS FOR PREPARING A FERRIC NITRATE REAGENT FROM COPPER RAFFINATE SOLUTION AND USE OF SUCH REAGENT IN THE LEACHING AND/OR CURING OF COPPER SUBSTANCES

(71) Applicants: Alejandro Cartagena Fagerstrom, Santiago (CL); Ernesto Beas Bustos, Santiago (CL); Manuel Cartagena Fagerstrom, Machali (CL); Christian Hecker Cartes, Concepción (CL)

(72) Inventors: Alejandro Cartagena Fagerstrom, Santiago (CL); Ernesto Beas Bustos, Santiago (CL); Manuel Cartagena Fagerstrom, Machali (CL); Christian Hecker Cartes, Concepción (CL)

(73) Assignee: Likivia Process Metalúrgicos SPA, Santiago de Chile (CL)

( * ) Notice: Subject to any disclaimer, the term of this patent is extended or adjusted under 35 U.S.C. 154(b) by 791 days.

(21) Appl. No.: 14/035,226

(22) Filed: Sep. 24, 2013

(65) Prior Publication Data

US 2015/0082943 A1    Mar. 26, 2015

(51) Int. Cl.
  *C22B 15/00*    (2006.01)
  *C01G 49/00*    (2006.01)

(52) U.S. Cl.
  CPC .......... *C22B 15/0073* (2013.01); *C01G 49/00* (2013.01); *C22B 15/0008* (2013.01); *Y02P 10/236* (2015.11)

(58) Field of Classification Search
  CPC . C22B 15/0073; C22B 15/0008; C22B 7/007; C01G 49/00; Y02P 10/236
  See application file for complete search history.

(56) References Cited

U.S. PATENT DOCUMENTS

| 3,574,599 | A  | 4/1971 | Ortloff et al. |
| 4,091,070 | A  | 5/1978 | Riggs et al.   |
| 4,649,029 | A  | 3/1987 | Nirdosh        |
| 5,484,579 | A  | 1/1996 | O'Brien        |
| 6,261,527 | B1 | 7/2001 | Arroyo et al.  |

(Continued)

FOREIGN PATENT DOCUMENTS

| AU | WO 93/08310 A1 | 4/1993 |
| CA | 1241544        | 9/1988 |

(Continued)

OTHER PUBLICATIONS

Extended European Search Report dated Feb. 5, 2015.

(Continued)

*Primary Examiner* — Arun S Phasge
(74) *Attorney, Agent, or Firm* — Kenneth M. Motolenich-Salas

(57) ABSTRACT

This invention relates to a process for preparing a ferric nitrate ($Fe(NO_3)_3$) reagent, capable of serving as a solvent and copper species oxidizing agent in the ore curing, heap leaching, and/or run of mine (ROM) leaching of a copper ore hydrometallurgical process located at a brown field or green field, from an aqueous copper raffinate solution from the copper ore hydrometallurgical process of copper ore containing iron (II) ($Fe^{2+}$), and the reagent prepared pursuant to this process.

49 Claims, 5 Drawing Sheets

(56) References Cited

U.S. PATENT DOCUMENTS

| | | | | |
|---|---|---|---|---|
| 6,569,391 | B1* | 5/2003 | Arias | ............ C22B 15/0071 205/583 |
| 2003/0230171 | A1 | 12/2003 | Imamura | |
| 2004/0144208 | A1* | 7/2004 | Ando | ............ C22B 15/0069 205/580 |

FOREIGN PATENT DOCUMENTS

| | | |
|---|---|---|
| CL | 197400369 | 5/1974 |
| CL | 197500109 | 2/1975 |
| CL | 85296 | 3/1997 |
| CL | 199900001 | 10/1999 |
| CL | 200702699 | 9/2006 |
| CL | 2009-01736 | 8/2009 |
| CL | 200902122 | 8/2009 |
| CL | 1242 | 5/2011 |
| CN | 1821428 | 8/2006 |
| CN | 1325668 | 7/2007 |
| CN | 1325688 | 7/2007 |
| CN | 102105224 | 6/2011 |
| EP | 12793331.5 | 6/2015 |
| ES | 2212782 | 8/2004 |
| ES | 2265265 | 2/2007 |
| GB | 492621 | 9/1938 |
| KR | 20090104327 | 10/2009 |
| KR | 100957855 | 5/2010 |
| RU | 2190700 | 10/2002 |
| RU | 2233343 C2 | 7/2004 |
| SU | 98143 | 12/1982 |
| WO | WO2005005672 | 1/2005 |
| WO | WO2012162851 | 6/2012 |

OTHER PUBLICATIONS

Notification of Transmittal of the International Search Report and the Written Opinion of the International Searching Authority, Jun. 15, 2015.

Chilean Pat. Office Action, Sep. 15, 2015, Lixivia Ltda.,Cartagena F.

"Resolución de notificación del informe pericial [ley nueva]"/ "Informe pericial sobre solicitud de patente de invención," Instituto Nacional de Propiedad Industrial—INAPI (Chile), Jan. 29, 2014.

Pashkov, G.L. et al "Effect of Potential and Ferric Icons on Lead Sulfide Dissolution in Nitric Acid" Hydrometallurgy 63, (2002) p. 171-179.

M.C. Fuerstenau; C.O. Nebor; B.V. Elango and K.N. Han "The Kinetics of Leaching Galena with Ferric Nitrate" Metallurgical Transactions B, vol. 18B, Mar. 1987 p. 25-30.

\* cited by examiner

PROCESS FOR PREPARING A FERRIC NITRATE REAGENT FROM COPPER RAFFINATE SOLUTION AND USE OF SUCH REAGENT IN THE LEACHING AND/OR CURING OF COPPER SUBSTANCES

FIELD

This invention relates to a process for preparing a ferric nitrate ($Fe(NO_3)_3$) reagent, capable of serving as a solvent and copper species oxidizing agent in the ore curing, heap leaching, and/or run of mine (ROM) leaching of a copper ore hydrometallurgical process, located at a brown field or green field, from an aqueous copper raffinate solution from the copper ore hydrometallurgical process of copper ore containing iron (II) ($Fe^{2+}$), and the reagent prepared pursuant to this process. When integrated with a copper ore hydrometallurgical process, such a process is particularly adapted for instances in which the leaching operation (extraction of a soluble constituent from a solid mixture by washing or percolation operations) of the copper ore hydrometallurgical process involves copper sulfide ore species. A process for treatment of sulfur-bearing copper substances (i.e., an aqueous stream with sulfur-bearing copper mining solids suspended therein), such as from ROM leaching, including, by way of example only and not of limitation, copper concentrate, copper tailings, smelting slags, and/or dust process products using a ferric nitrate reagent produced from the oxidation of iron (II) to iron (III) ($Fe^{3+}$) is also disclosed.

BACKGROUND

Heap leaching is an industrial mineral process to extract precious metals, such as copper, from ore via a series of chemical reactions that absorb specific target copper-bearing minerals with subsequent separation of these precious metals from other earth materials. The experience at heap leaching plants for copper oxides having nitrate ($NO_3^-$) salts found in copper ore deposits has shown that sulfuric acid ($H_2SO_4$) consumption is generally much lower than budgeted by design (acid consumption <50%), when nitrate levels have remained high in the copper ore deposits.

The main concern of copper producers was the damage caused by the presence of nitrate salts in the solvent extraction and electrowinning (i.e., electrodeposition), also known as electro extraction, stages, rather than the benefits from sulfuric acid savings effectuated when sulfuric acid consumption was less than design levels due the presence of nitrate salts. Different mixtures of reagents were used in the solvent extraction and re-extraction stages to ensure appropriate extraction and re-extraction efficiency. Likewise, lower doses of a polysaccharide "guar" additive (such as Galactasol, OPT-45, Guartec, and Guarfloc) in the electrowinning process allowed control of premature degradation of this polysaccharide due to nitrate ions ($NO_3^-$), resulting in massive formation of stripes over the cathodes in the electrowinning cell. This issue appeared frequently in plants where the control of impurity carryover from solvent extraction was not completely efficient and nitrate levels in the electrolyte solution exceeded 50 parts per million (ppm).

The analysis of the problem associated with nitrates in leaching of copper oxide plants, coupled with the inventors' industrial experience, indicate that the presence of nitrate ions in the leaching and electrowinning processes can be beneficial so long as there is an appropriate control of nitrate ion levels in the different aqueous solutions generated or used in the ore curing, leaching, or electrowinning processes.

Therefore, it is interesting to point out the chemical properties of nitrates as compared to sulfates ($SO_4^{2-}$). At equal ion mobility for each sulfate anion, there are two nitrate ions to neutralize a cationic species, for example the copper (II) ion ($Cu^{2+}$), but with a great chemical difference: nitrates are one hundred percent soluble in water; however, not all sulfates are water-soluble. This is the material difference that explains why the presence of nitrate salts in ore deposits is so beneficial. Additionally, this explains the low consumption rate of sulfuric acid required during leaching when the deposits contain nitrate salts.

In the matter of heap leaching of metal sulfides, it is highly desirable to apply the experience obtained from copper oxide (CuO) leaching to the copper sulfide (CuS) leaching, based on the following premise. Heap leaching of mixed ores and secondary copper sulfides uses water, sulfuric acid and bacteria to dissolve the useful species. Bacterial leaching is essentially based on the ability of microorganisms to oxidize the iron (II) ($Fe^{2+}$) content in raffinate solutions (also known as raffinate) to iron (III) ($Fe^{3+}$) as a result of metabolic processes. In bacterial leaching of copper sulfides and copper mixed ores, the electrochemical couple or redox pair $Fe^{3+}/Fe^{2+}$ provides the redox conditions in the galvanic cell which allows for dissolution of useful species via an electrochemical process as what occurs in copper oxide leaching. In this way, the microbes catalyze, through their metabolic processes, the oxidation of $Fe^{2+}$ to $Fe^{3+}$. It is important to bear in mind that the electrochemical system $Fe^{3+}/Fe^{2+}$ is reversible and therefore, the oxide-reduction kinetics is very fast on conductive substrates. This process, which appears to be very efficient and simple, depends to a great extent on the bacteria concentration in heaps and the bacterial activity which, in turn, depends on (i) environmental factors, such as temperature, acidity, air pressure, and passivating chemicals, and (ii) the chemical composition of the relevant heap structure. Moreover, in the case where the water used is seawater, there are more passivating chemicals which would hinder the bacterial activity.

Chilean patent CL43295 to Jaime Arias ("Arias Patent") discloses a method for extracting copper or other metals from sulfide ores, without the addition of oxygen gas ($O_2$) to the ore and without the production of $NO_x$ gases, the method comprising the following steps:

Crushing the ore to a size smaller than 6 microns (0.006 m);

Treating such ore with concentrated sulfuric acid to agglomerate the fine particles and impregnate the ore with acid;

Stacking of treated ore in a heap of less than 12 m in height;

Irrigating the heap with dilute aqueous solution consisting of sulfuric acid and sodium nitrate ($NaNO_3$) to obtain the leaching product;

Collecting the leaching product from the heap; and

Recovering the copper metal from that leaching product by electrolysis.

The Arias Patent, however, is restricted to sulfide leaching using sodium nitrate and not to the preparation of a reagent to be used in leaching.

The research study conducted by M. C. Fuerstenau, C. O. Nebo, B. V. Elango, and K. N. Han, entitled The Kinetics of Leaching Galena with Ferric Nitrate, studied the leaching rate of a sulfide ore, i.e. galena, adding an aqueous ferric nitrate ($Fe(NO_3)_3$) solution with a concentration of 0.25 M [mol/L]. The study does not show how to obtain the ferric nitrate.

The U.S. Pat. No. 4,649,029 to Inderjit Nidrosh discloses a method for extracting uranium (U) and radium (Ra) from sulfide ores and incorporating ferric nitrate in the leaching process, without mentioning how to obtain ferric nitrate. The process is comprised of the following steps:

Crush the ore finely to remove the sulfide therefrom;

Leach the finely ground ore with aqueous acidic ferric nitrate solution in a concentration range of 0.01 to 0.1 M for the removal of uranium and radium;

Separate uranium and radium from the resulting leaching solution; and

Recover the ferric nitrate, uranium, and radium from the leached ore.

PCT Application WO 2012/162851 A1 [PCT/CL2012/000022] to Alejandro Cartagena Fagerström and Christian Hecker Cartes discloses a method of generating ferric nitrate as a oxidizing and dissolving agent for copper species, especially in copper sulfides from the concentration of iron from a copper raffinate solution of a hydrometallurgical process but does not provide for the dosing of ferric nitrate to stages of the copper sulfide ore hydrometallurgical process in which the very ferric nitrate reagent is produced.

BRIEF DESCRIPTION OF THE INVENTION

The bacterial activity described above is replaced by a process generating a ferric nitrate ($Fe(NO_3)_3$) reagent that is soluble and stable in neutral and acidic aqueous processing solutions, said reagent used in the oxidation and leaching of copper sulfides and other sulfide ores, including use in one or more of (i) the ore curing and (ii) heap leaching stages of a copper ore hydrometallurgical process of copper ore containing iron (II) located at a brown or green field, (iii) as well as for the ROM leaching and leaching of other sulfur-bearing copper substances. Upon incorporation of this reagent into the sulfur-bearing copper substances in the heap leaching and ore curing stages, two ions integral to copper sulfide leaching are generated: iron (III) ($Fe^{3+}$) and nitrate ($NO_3^-$). Iron (III) is of vital importance for electrochemical leaching of copper sulfides, generating iron (II) ($Fe^{2+}$) product to pass to the aqueous solution. Additionally, the nitrate ions are used to regenerate iron (III). Indeed, the nitrate ions impose strong oxidizing conditions (high redox potential) to the aqueous solution, making iron (II) unstable, which inhibits the precipitation of ore species, like jarosites ($KFe(OH)_6(SO_4)_2$), wherein iron is present as iron (III)), which impairs the recovery and kinetics of copper leaching. Consequently, given the rapid chemical dissolution and kinetics involved in the oxidation of iron (II) to iron (III), iron (II) rapidly oxidizes to iron (III), restoring in-situ redox conditions to reestablish the leaching cycle.

One feature of this invention is to provide a process for the production of a ferric nitrate reagent from a copper ore hydrometallurgical process of copper ore containing iron (II) located at a brown or green field, which is then introduced into the ore curing and/or heap leaching stage of said copper ore hydrometallurgical process, and optionally as well in the ROM leaching of the copper ore hydrometallurgical process. The process is comprised of (a) providing an aqueous copper raffinate solution from a copper organic solvent extraction stage of a copper ore hydrometallurgical process of copper ore containing iron (II); (b) concentrating iron (II) in the aqueous copper raffinate solution; (c) forming a first mixture comprising the concentrated aqueous iron (II) solution and an acidic aqueous sodium nitrate solution; (d) effectuating an electrochemical reaction with the first mixture, wherein iron (II) is oxidized to iron (III) to produce a ferric nitrate reagent, an aqueous sodium hydroxide solution is produced, and water is produced; (e) forming a second mixture comprising the ferric nitrate reagent, sulfuric acid, water, and aqueous copper raffinate solution; (f) dosing the second mixture to the heap leaching stage; and/or (g) dosing the ferric nitrate reagent and sulfuric acid to the copper ore curing stage.

Another feature of the invention is to provide a process for treatment of sulfur-bearing copper substances such as from ROM leaching including, by way of example only and not of limitation, copper concentrate, valuable copper tailing and/or smelting slags and/or dust process products, using ferric nitrate reagent produced from the forming of a mixture of (i) a copper raffinate solution from a copper organic solvent extraction process, (ii) an acidic aqueous sodium nitrate solution, and an (iii) aqueous iron (II) makeup solution, with oxidation of the iron (II) in the mixture to iron (III) ($Fe^{3+}$).

An additional feature of the invention is to provide a ferric nitrate reagent according to the above-described process wherein such reagent is capable of use in one or more of the (i) ore curing and (ii) heap leaching stages of the copper ore hydrometallurgical process located at a brown or green field, (iii) as well as in the leaching (such as ROM leaching) of other sulfur-bearing copper substances associated with a copper ore hydrometallurgical process.

DETAILED DESCRIPTION OF THE INVENTION

Figure 1:
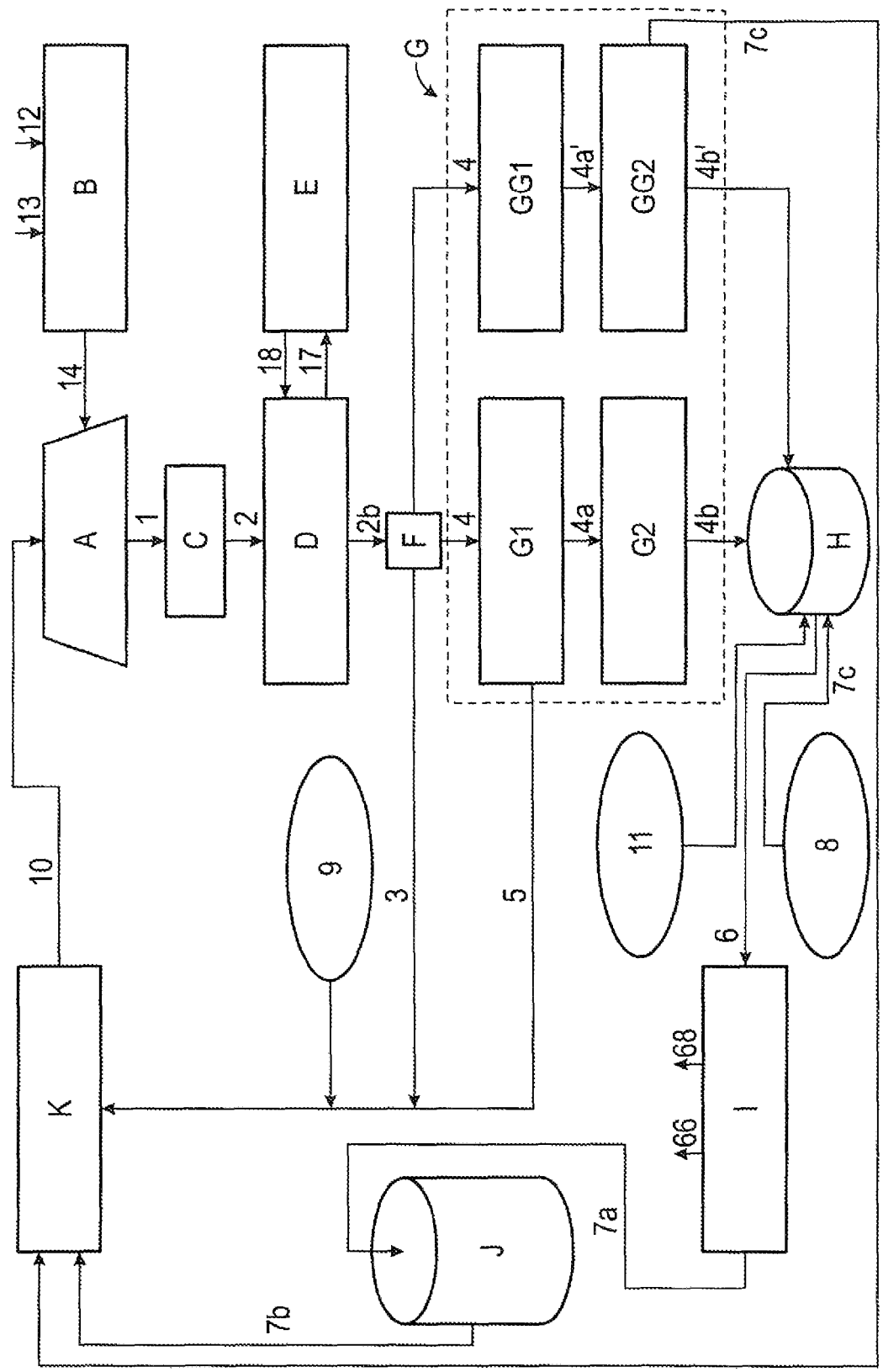
FIG. 1 is a flow chart of a preferred embodiment of a process for preparing a ferric nitrate reagent from copper raffinate solution from a copper ore hydrometallurgical process and use of such reagent for ore curing and/or heap leaching stages of said copper ore hydrometallurgical process according to the invention.

The mining industry, and mainly the copper mining industry, needs a new, useful, and non-obvious process to generate a chemical reagent with high chemical dissolution and oxidizing power to ensure greater copper (II) ($Cu^{2+}$) recovery in the leaching process of copper metal sulfides. The present invention meets such goal by introducing a ferric nitrate reagent ($Fe(NO_3)_3$) prepared according to the process of the invention into the ore curing and/or heap leaching stages of a copper ore hydrometallurgical process located at a brown or green field. In addition, the ferric nitrate reagent produced according to the invention may be used in the leaching of other sulfur-bearing copper substances commonly encountered in the copper mining industry, such as from ROM leaching including, by way of example only and not of limitation, old and fresh copper tailings, copper concentrate with or without arsenic (As), copper smelting slags, and copper smelting dust.

Desired Characteristics of Ferric Nitrate Reagent

The ferric nitrate reagent prepared pursuant to the inventive processes has the following properties:

High Copper Dissolution Power:

The reagent is a ferric nitrate ($Fe(NO_3)_3$) aqueous solution, the concentration of which varies according to process needs, to maximize copper dissolution. A nitrate-based solvent ensures one hundred percent solubility of iron in the aqueous solution due to its nitrate-based salt formula ($NO_3^-$). The nitrate anion is in fact a very potent chemical agent thereby stabilizing the iron (III) so that it remains in solution by inhibiting the precipitation of chemical compounds, such as iron sulfate salts like jarosite, which would adversely affect (i.e., slow down) the kinetics of the leaching of copper sulfides.

Table 1 shows the aqueous solubility of certain metallic nitrates and metallic sulfates at 25° C.:

TABLE 1

Water Solubility at 25° C. of Certain Nitrates and Sulfates.

| | $NO_3^-$ (g/L) | $(SO_4)^{2-}$ (g/L) |
|---|---|---|
| Barium (II) ($Ba^{2+}$) | 92 | <0.01 |
| Calcium (II) ($Ca^{2+}$) | 1293 | 1.90 |
| Copper (II) ($Cu^{2+}$) | 1251 | 207.00 |
| Iron (II) ($Fe^{2+}$) | 87.5 | 3.00 |
| Iron (III) ($Fe^{3+}$) | Highly Soluble | Soluble |
| Silver (I) ($Ag^+$) | 2220 | 7.96 |
| Potassium (I) ($K^+$) | 316 | 111.00 |
| Sodium (I) ($Na^+$) | 880 | 194.00 |

Source: The Chemical Engineering Handbook (Manual del Ingeniero Químico), VI Edition.
*CRC Handbook of Chemistry and Physics, XC Edition. Water solubility at 25° C.

Based on the data in Table 1, it is noted that for salts consisting of the same cations, nitrates are remarkably more water soluble than sulfates.

High Redox Potential:

The reagent is a very powerful oxidant due to the presence of nitrate ion and high iron (III) concentration ($Fe^{3+}$) in the range of 2 to 5 grams per liter (2-5 g $Fe^{3+}$/L reagent solution), resulting in a high redox potential (strong oxidizing agent), with increasing redox potential as the iron (III) concentration is increased. If the oxidizing properties of the reagent were attributable only to the high ferric ion concentration, the redox potential would not exceed 770 mV standard hydrogen electrode (SHE). In this respect, the presence of nitrate ion is remarkable, since it increases the redox potential of the ferric nitrate solution and helps to make the iron (III) more stable, since its natural tendency is to the redox couple $Fe^{3+}/Fe^{2+}$, an electrochemical couple of reversible diffusion-controlled kinetics, thus ensuring a greater oxidizing power of the reagent due to the presence of ferric ion ($Fe^{3+}$) in the reagent. The ferric nitrate reagent produced according to the process of the invention preferably ensures a redox potential higher than 850 mV (Ag/AgCl) (Ag/AgCl reference electrode) according to Table 6 as indicated therein by sample no. 5. The process to prepare the ferric nitrate chemical reagent of the invention for use in the for ore curing and heap leaching processes of a copper ore hydrometallurgical process of copper ore containing iron (II) located at a brown or green field comprises the following steps:

a. Providing an aqueous copper raffinate solution from a copper organic solvent extraction stage of a copper ore hydrometallurgical process of copper ore containing iron (II);

b. Concentrating iron (H) in the aqueous copper raffinate solution;

c. Forming a first mixture comprising the concentrated aqueous iron (II) solution and an acidic aqueous sodium nitrate solution;

d. Effectuating an electrochemical reaction with the first mixture, wherein iron (II) is oxidized to iron (III) to produce a ferric nitrate reagent, an aqueous sodium hydroxide solution is produced, and water is produced;

e. Forming a second mixture comprising the ferric nitrate reagent, sulfuric acid, water, and aqueous copper raffinate solution;

f. Dosing the second mixture to the heap leaching stage; and/or g. Dosing the ferric nitrate reagent and sulfuric acid to the copper ore curing stage.

The ferric nitrate reagent may also be used in the leaching of other sulfur-bearing copper substances commonly encountered in the copper mining industry such as from ROM leaching, including, by way of example and not of limitation, old and fresh copper tailings, concentrated copper aqueous solutions with or without arsenic (As), copper smelting slags, and copper smelting dust.

FIG. 1 is a flow chart of a preferred embodiment of the ferric nitrate production process integrated with a copper ore hydrometallurgical process located at a brown field (i.e., those copper mining operations already designed with a conventional process of leaching with sulfuric acid wherein the ferric nitrate production process of the invention would be integrated as a process to be connected to the pre-existing process without affecting operations) or green field (i.e., those copper mining operations designed to specifically include the ferric nitrate production process of the invention). Whether used in a brown or green field, the ferric nitrate production process according to the invention would operate on the same basic principles since such process depends on the physical-chemical characteristics of the copper mineral to be treated.

A heap leaching stage A of a copper ore hydrometallurgical process provides a heap leaching solution stream 1 to a pregnant leaching solution (PLS) stage C. Said heap leaching solution stream 1 contains copper (II) ($Cu^{2+}$), iron (II) ($Fe^{2+}$), and nitrate ($NO_3^-$) ions, amongst other chemical species. The pregnant leaching solution stage C provides a pregnant leaching solution (PLS) discharge stream 2 which is fed to a copper organic solvent extraction stage D. The copper organic solvent extraction stage D extracts copper (II) out of the pregnant leaching solution (PLS) discharge stream 2 through processes known in the art, and feeds a concentrated copper stream 17 to a copper electrowinning (i.e., electrodeposition) process stage E. The copper electrowinning process stage E provides a discharge stream 18, which is an electrolytic solution commonly found in electrowinning processes as is known in the art, that is fed to the copper organic solvent extraction stage D. For a brown field operation, before integration of the process of the invention, it should be determined, by means of laboratory or pilot-scale testing, if the organic materials (extractant+diluent) currently in use for the copper organic solvent extraction stage D can be used such that stage D can operate effectively in the presence of nitrate ions. If it is determined that stage D with the existing organic materials cannot continue to be operated effectively due to the presence of nitrate ions, other organic materials (the extractant and/or diluent) that are available on the chemical market should be selected for possible use in stage D, with the suitability of such new organic materials confirmed beforehand via laboratory or pilot-scale testing.

The copper organic solvent extraction stage D, in addition to producing the concentrated copper stream 17, provides a copper raffinate solution stream 2b which contains a lower copper (II) concentration relative to the concentrated copper stream 17. Said copper raffinate solution stream 2b is thereafter used in a process for preparing a ferric nitrate ($Fe(NO_3)_3$) reagent for use in the heap leaching stage A, and/or a copper ore curing stage B of the copper ore hydrometallurgical process, as well as optionally for the leaching of other sulfur-bearing copper substances. The copper raffinate solution stream 2b is fed to a flow diverter operation F which diverts a portion of the copper raffinate solution stream 2b as a diverted stream 3 to an iron (III) adjustment raffinate pond K. The diverted stream 3 flow rate percentage (i.e., ratio of the volumetric flow rate of the diverted stream 3 to the volumetric flow rate of the copper raffinate solution stream 2b multiplied by 100%) preferably varies from 30 to 60%. However, the diverted stream 3 flow rate percentage can vary as needed to suit operational requirements.

The balance of the copper raffinate solution stream 2b not sent to the iron (III) adjustment raffinate pond K through diverted stream 3 is introduced into an iron concentration stage G as an iron concentration phase feed stream 4. The iron concentration stage G, which is discussed in greater detail below, can take one of two alternatives. Alternative 1 of iron concentration stage G is comprised of a first extraction stage G1 and a second extraction stage G2. The first extraction stage G1 is an organic solvent-based or other iron (II) extraction method known in the art which produces an iron (II)-poor aqueous discharge stream 5 which is fed to iron (III) adjustment raffinate pond K. The first extraction stage G1 produces an iron (II) organic discharge stream 4a which is fed to an iron (II) stripping stage G2 wherein iron (II) is stripped from the iron (II) organic discharge stream 4a, using techniques known in the art, into the aqueous phase producing a concentrated aqueous iron (II) solution stream for use in an electrochemical reaction with other reactants to generate ferric nitrate as described herein.

Alternative 2 of iron concentration stage G is comprised of an iron (II) precipitation stage GG1 wherein the iron (II) in the iron concentration phase feed stream 4 is contacted with concentrated aqueous sodium hydroxide (NaOH) to effectuate the precipitation of iron (II) as iron hydroxide ($Fe(OH)_2$). The precipitation stage GG1 of alternative 2 produces a discharge stream 4a' which is characterized in having iron hydroxide suspended in an aqueous solution. Said discharge stream 4a' is introduced into a solid/liquid separation phase GG2 which uses techniques known in the art to impart the separation of the suspended solids in discharge stream 4a'. After imparting phase separation through gravity and/or other means known in the art for the separation of iron-based solids from an aqueous solution, the solid/liquid separation phase GG2 produces a concentrated aqueous iron (II) solution stream 4b'. Most of stream 4b' is used in an electrochemical reaction with other reactants to generate ferric nitrate reagent as described herein. The remaining concentrated iron (II) aqueous solution produced by solid/liquid separation phase GG2 is discharged from said phase GG2 as an aqueous bypass stream 7c which is introduced into the iron (III) adjustment raffinate pond K. The bypass stream 7c flow rate percentage (i.e., the ratio of the volumetric flow rate of the bypass stream 7c to the volumetric flow rate of discharge stream 4a' [the stream fed to solid/liquid separation phase GG2] multiplied by 100%) varies from 5 to 15%, with the flow rate percentage selected based on process requirements.

In a preferred embodiment of the invention, the electrochemical reaction employed to produce the ferric nitrate reagent of the invention is carried out by feeding an iron-bearing aqueous stream discharged from the iron concentration stage G and other reactants to an electrochemical reactor. The concentrated aqueous iron (II) solution stream 4b or 4b' is used to form a mixture with acidic aqueous sodium nitrate solution and then undergo an electrochemical reaction to form ferric nitrate reagent. Preferably, concentrated aqueous iron (II) solution stream 4b from the iron concentration stage alternative 1 or 4b' from the iron concentration stage alternative 2 is joined with concentrated sodium nitrate ($NaNO_3$) aqueous stream 11 by feeding said streams into the electrochemical reactor feed tank H. Alternatively, if the iron (II) concentration in either stream 4b or 4b' is insufficient such that the iron (II) concentration of an electrochemical reactor feed stream 6 discharged from the feed tank H is below approximately 50 grams of iron (II) per liter (g $Fe^{2+}$/L), an iron (II) makeup stream 8 can be introduced into the feed tank H to ensure the iron (II) concentration in the feed stream 6 meets this threshold. Situations in which use of the iron (II) makeup stream 8 is integrated into the described process include, by way of example only and not of limitation, when the iron (II) concentration in copper raffinate solution stream 2b is not sufficient to allow for an iron (II) concentration at the required threshold for the electrochemical reactor feed stream 6. The iron (II) makeup stream 8 and its source, including sources from the oxidation of metal iron with sulfuric or nitric acid or, optionally, with iron ore pellet, are discussed in greater detail below.

The electrochemical reactor feed tank H allows for providing a uniform, homogenous aqueous solution comprised in part of nitrate ($NO_3^-$) and iron (II) ions. In addition, to control of any organic solvent carryover from alternative 1 of the iron concentration stage G, the electrochemical reactor feed tank H preferably includes a system known in the art to ensure separation out of any such organic solvent such that any such organic solvent is not present in the electrochemical reactor feed stream 6 discharged from feed tank H.

As discussed above, feed tank H provides the electrochemical reactor feed stream 6 which is introduced into an electrochemical reactor I comprised of at least one electrolytic cell, each comprising an anode, cathode, and a membrane separating the anode and cathode, the operation, structure, and other details of which are discussed in greater detail below. Preferably, if more than one electrolytic cell is used in electrochemical reactor I, the cells are positioned in parallel. Within electrochemical reactor I and as a result of the imposition of an electrical charge, iron (II) ($Fe^{2+}$) is oxidized to iron (III) ($Fe^{3+}$) and reacts with the nitrate ions ($NO_3^-$) in solution to form a concentrated aqueous ferric nitrate ($Fe(NO_3)_3$) reagent. Specifically, the sodium nitrate reacts with the iron (II) in the anodic section of the electrolytic cell(s) within electrochemical reactor I, thereby oxidizing the iron (II) to iron (III) in the form of ferric nitrate. An electrochemical reactor discharge stream 7a that is concentrated in said ferric nitrate reagent is fed to a ferric nitrate reagent storage tank J. The concentrated ferric nitrate solution is retained in tank J to be later distributed and dosed in the (i) heap leaching stage A of the copper ore hydrometallurgical process after dilution with other constituents as described herein, and/or (ii) ore curing stage B of the copper ore hydrometallurgical process. Preferably, the dosing of ferric nitrate reagent for heap leaching stage A takes place in the iron (III) adjustment raffinate pond K while in the ore curing stage B, ferric nitrate reagent 12 is dosed directly into ore curing stage B along with sulfuric acid and one of copper raffinate solution 2b from the copper organic solvent extraction stage D or water. Other streams produced by the electrochemical reactor I as a result of the electrochemical reaction that takes place therein are a water discharge stream 66 and a concentrated aqueous sodium hydroxide (NaOH) stream 68 which can be introduced into the precipitation stage GG2 of the iron concentration stage alternative 2 to effectuate the precipitation of iron (II) as iron hydroxide ($Fe(OH)_2$).

When needed for use in the heap leaching stage A, ferric nitrate reagent is fed from tank J as ferric nitrate storage tank discharge stream 7b to iron (III) adjustment raffinate pond K into which, as discussed above, is introduced diverted stream 3 from flow diverter operation F and iron (II)-poor aqueous discharge stream 5 from extraction stage G1 of iron concentration stage alternative 1 if such alternative is in place. Within the iron (III) adjustment raffinate pond K, the ferric nitrate concentration is adjusted as needed for the particular characteristics of the heap leaching stage A of the copper ore hydrometallurgical process. A water make-up stream 9 alternatively is also introduced into the iron (III) adjustment raffinate pond K as needed to ensure the proper solution inventory within pond K and level of aqueous solution within heap leaching stage A. In addition, iron (III) adjustment raffinate pond K allows for clarification of the ferric nitrate reagent whereby any suspended solids or other undesired constituents found in any streams fed to pond K can settle out of solution to the bottom of pond K.

Upon achieving the proper ferric nitrate concentration within pond K as dictated by the specific heap leaching stage A of a copper ore hydrometallurgical process, stream 10 discharged from pond K may be introduced into the heap leaching stage A of the copper ore hydrometallurgical process. This introduction of ferric nitrate reagent to heap leaching stage A will improve the oxidation and leaching of copper sulfides in sulfur-bearing copper mining ores.

The ferric nitrate reagent produced pursuant to this process may also be introduced into the ore curing stage B of the copper ore hydrometallurgical process as ferric nitrate reagent stream 12, taken directly from storage tank J, along with a concentrated aqueous sulfuric acid ($H_2SO_4$) stream 13. The use of ferric nitrate significantly improves the copper recovery achieved during the ore curing stage B of the copper ore hydrometallurgical process. Thus, use of the ferric nitrate reagent produced pursuant to the inventive process described herein has the dual benefits of improving the (1) oxidation and leaching of copper sulfides in sulfur-bearing copper mining ores through use of the reagent in the ore curing stage B, and/or (2) copper recovery during the heap leaching stage A.

In addition, the invention also relates to the leaching of other sulfur-bearing copper substances, especially those commonly found in the copper mining industry, in much the same manner as the leaching of copper which occurs in heap leaching stage A. This leaching entails the forming of a mixture of ferric nitrate with an aqueous solution of sulfur-bearing copper solids suspended therein and agitating such mixture to effectuate the sulfation of the copper therein to form cupric sulfate ($CuSO_4$) and reduce the iron (III) in the ferric nitrate reagent to aqueous iron (II). The ferric nitrate reagent utilized in this leaching process is preferably produced from an electrochemical reaction of aqueous iron (II) in the presence of acidic aqueous sodium nitrate.

For any of the process streams or unit operations used in any embodiment of the invention, the monitoring of the parameters of such streams or unit operations, such as, by way of example and not of limitation, the temperature, pressure, flow rate, concentration of stream constituents, redox potential, and other physical-chemical characteristics, can be performed either on a continuous or non-continuous basis as is generally known in the art. This includes monitoring the ferric nitrate reagent concentration in the heap leaching A and/or ore curing stage B so as to detect any change in ferric nitrate concentration therein, which will allow the operator to add ferric nitrate reagent to the respective stage if the ferric nitrate reagent concentration in the respective stage, as measured through monitoring, is below a level determined to be effective for the stage, such level determined for each particular stage according to the materials being processed in such stage.

The unit operations, process streams, operating conditions, and physical-chemical transformations and chemical reactions of embodiments of the invention are described in detail below.

DETAILED DESCRIPTION OF PROCESS

Sources of Ferrous Ion for the Process

From Raffinate Solutions:

The process according to the invention requires a source of ferrous ions ($Fe^{2+}$ or iron (II)). With reference to FIG. 1, which depicts a preferred embodiment of the invention, one of the sources of ferrous ions for use in the process according to the present invention is ferrous sulfate ($FeSO_4$) naturally present in the copper raffinate solution stream 2b from the copper ore hydrometallurgical process. Use of the ferrous sulfate naturally found in stream 2b reduces the operational and material costs which would be required if the stream 2b did not contain a natural source of iron (II) as it would require the integration of an (i) external iron (II) source and (ii) associated unit operation required for introducing the iron (II) with stream 2b with the process according to the invention.

From Metal Iron:

With reference to FIG. 1, if the copper ore to undergo the leaching process does not have the ferrous (iron (II)) concentration necessary to sustain the process according to the invention, such iron (II) needs to be provided by an external supply fed to electrochemical feed tank H in the form of iron (II) makeup stream 8. Iron (II) makeup stream 8 can originate from one of the various methods known in the art of providing an aqueous iron (II) stream. Such external iron (II) supplies can include, by way of example and not limitation, the leaching of metallic iron in the form of iron dust, metal iron in fine particles or other geometry, or iron ore pellets with sulfuric acid ($H_2SO_4$), referred to as sulfuric acid iron leaching, and/or nitric acid ($HNO_3$), referred to as nitric acid iron leaching. Herein, these forms of leaching are referred to as acid iron leaching. In acid iron leaching, the metallic iron is dissolved into the acid and is oxidized to yield ferrous ions ($Fe^{2+}$ or iron (II)) and hydrogen gas ($H_2$). Sulfuric acid iron leaching must be performed in an anoxic (non-oxygenated) reduced environment. Alternatively, if the presence of oxygen cannot be eliminated, the metallic iron can be dissolved into dilute aqueous nitric acid ($HNO_3$) and oxidized to yield ferric ions (nitric acid iron leaching). Preferably, if the iron (II) levels in the copper raffinate solution stream 2b are too low to sustain a concentration of 50 g/L of $Fe^{2+}$ in electrochemical reactor feed stream 6, then iron (II) is supplied via acid iron leaching as is known in the art.

Iron (II) Concentration Stage G:

The process according to a preferred embodiment of the invention includes the concentrating of iron (II) in solution to decrease the volumetric flow rate of the electrochemical reactor feed stream 6 entering electrochemical reactor I. Iron concentration stage G allows for use of lower flow rates in the process according to the invention which in turn allows for a reduced size and/or the number of electrochemical reactors I. The volume of electrochemical reactor I is determined by considering a number of process variables including but not limited to the total volume of copper raffinate solution from copper raffinate solution stream 2b necessary to produce the desired volume of ferric nitrate reagent and the iron (II) concentration in stream 2b. Iron concentration stage G can be performed in one of two methods selected from the group consisting of organic solvent extraction and a coupled precipitation of iron (II) as iron hydroxide ($Fe(OH)_2$) and solid/liquid separation process, the details of which are set forth below.

With reference to FIG. 1, copper raffinate solution stream 2b is fed from a copper organic solvent extraction stage D of a copper ore hydrometallurgical process to a flow diverter operation F. Said flow diverter operation F can take the form of a diverter box, other piping arrangement, or other unit operation known in the art to split one feed stream into at least two discharge streams. Preferably, flow diverter operation F is a diverter box.

A portion of copper raffinate solution stream 2b is diverted to an iron (III) adjustment raffinate pond K as diverted stream 3. The diverted stream 3 flow rate percentage, that is, the ratio of the volumetric flow rate of the diverted stream 3 to the volumetric flow rate of the copper raffinate solution stream 2b multiplied by 100%, can vary as needed to suit operational requirements. The balance of copper raffinate solution stream 2b not sent to iron (III) adjustment raffinate pond K through diverted stream 3 is introduced into an iron concentration stage G as an iron concentration phase feed stream 4. Iron concentration stage G can take the form of alternative 1, which is comprised of a first extraction stage G1 followed by a second extraction stage G2. First extraction stage G1 utilizes an organic solvent or other method known in the art to extract and concentrate iron (II). Preferably, organic di-(2-ethylhexyl)phosphoric acid (HDEHP) dissolved in kerosene is used as the solvent in first extraction stage G1.

By way of example only and not of exclusion, use of such a kerosene-based solvent fed to a liquid-liquid solvent extractor or other unit operation known in the art to effectuate organic solvent-based metallic species extraction in the first extraction stage G1, wherein the iron (II) in the aqueous-phase iron concentration feed stream 4 is extracted into the organic phase is represented by the following reaction:

$$Fe^{2+}(a)+2(HX)_2(o) \rightarrow FeX_4H_2(o)+2H^+(a) \quad \{1\}$$

wherein HX is HDEHP, $FeX_4H_2$ is an iron (II)-organic complex, (a) refers to the aqueous phase, and (o) to the organic phase.

Experimental tests were conducted to determine the extraction efficiency of iron (II) using HDEHP as the extracting solvent and kerosene as the diluent as set forth above. An aqueous solution was prepared with the following concentrations: 4.15 g/L of iron (II) ($Fe^{2+}$), 0.5 g/L of copper (II) ($Cu^{2+}$), and 12 g/L of sulfuric acid ($H_2SO_4$). The aqueous phase was contacted with the organic phase and agitated, with the agitation time varied. The results are shown in Table 2:

TABLE 2

Extraction of iron using an organic solution: 1:1 by volume of HDEHP and kerosene.

| Contact Time | Iron (g/L) in Aqueous Phase | Iron (g/L) in Organic Phase | Percentage of Iron Organic Phase (% by wt) |
| --- | --- | --- | --- |
| 10 minutes | 3.67 | 0.48 | 11.6 |
| 50 minutes | 2.72 | 1.43 | 34.4 |
| 100 minutes | 2.67 | 1.48 | 35.7 |

The results indicate it is possible to extract iron (II) from the aqueous phase into the organic phase with an efficiency of about 35 percent or more in the first extraction stage G1.

As indicated in Reaction {1}, the first extraction stage G1 produces two discharge streams. The organic product of Reaction {1}, i.e., the $FeX_4H_2$ (o) of Reaction {1}, is discharged from first extraction stage G1 as an iron (II) organic discharge stream 4a. The aqueous-phase stream of hydrogen ions ($H^+$) produced as indicated in Reaction {1} is discharged from first extraction stage G1 as an iron-poor acidic aqueous discharge stream 5 with a pH in the range of 0 to 1.5. Said stream 5 is fed to iron (III) adjustment raffinate pond K. The iron (II) organic discharge stream 4a is fed to second extraction stage G2 wherein iron (II) is stripped from the iron (II) organic discharge stream 4a, using techniques known in the art, into the aqueous phase, producing an iron (II) aqueous feed tank feed stream 4b. The iron (II) extraction occurring in second extraction stage G2, wherein iron (II) is extracted from the organic phase to the aqueous phase by contacting said stream 4a with concentrated mineral acid, is represented by Reaction {2} below:

$$FeX_4H_2(o)+2H^+(a) \rightarrow Fe^{2+}(a)+2(HX)_2(o) \quad \{2\}$$

wherein $FeX_4H_2$ (o) is an iron (II)-organic complex, (o) refers to the organic phase, (a) refers to the aqueous phase, and HX is HDEHP. The concentrated mineral acid used in second extraction stage G2 can be any one of such acids known in the art capable of extracting iron (II) from the organic phase including, by way of example only and not of limitation, hydrochloric acid (HCl) or sulfuric acid ($H_2SO_4$).

Experimental tests were conducted to determine the extraction efficiency of the second extraction stage G2 wherein iron (II) was extracted from the organic phase to the aqueous phase, using one of hydrochloric acid (HCl) and sulfuric acid ($H_2SO_4$), both in 3 M concentrations at ambient conditions, the results of which are shown in Table 2.1 and Table 2.2, respectively.

TABLE 2.1

Re-extraction of iron (II) in organic phase with
100 mL of HCl (3M) at ambient conditions:

| Contact Time | Iron (II) (g/L) in Aqueous Phase | Iron (II) (g/L) in Organic Phase | Percentage of Iron (II) in Aqueous Phase (% by wt) |
|---|---|---|---|
| 600 s | 0.0248 | 0.4552 | 5.2 |
| 3,000 s | 0.0600 | 1.3700 | 4.2 |
| 6,000 s | 0.0845 | 1.3955 | 5.7 |

TABLE 2.2

Re-extraction of iron (II) in organic phase with
100 ml of $H_2SO_4$ (3M) at ambient conditions:

| Contact Time | Iron (II) (g/L) in Aqueous Phase | Iron (II) (g/L) in Organic Phase | Percentage of Iron (II) in Aqueous Phase (% by wt) |
|---|---|---|---|
| 600 s | 0.0008 | 0.4792 | 0.17 |
| 3,000 s | 0.0120 | 1.4180 | 0.84 |
| 6,000 s | 0.0326 | 1.4474 | 2.20 |

The results indicate that re-extraction in second extraction stage G2 is more favorable with HCl than with $H_2SO_4$.

The second alternative of iron concentration stage G of a preferred embodiment of the invention, denominated herein and on FIG. 1 as alternative 2, is comprised of iron (II) precipitation stage GG1 according to methods known in the art wherein the iron (II) in the iron concentration phase feed stream 4 is contacted with concentrated aqueous sodium hydroxide (NaOH) at a pH of greater than 6.7, resulting in the formation and precipitation of iron hydroxide ($Fe(OH)_2$) according to Reaction {3} depicted below:

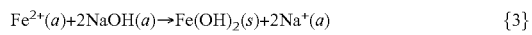

$$Fe^{2+}(a)+2NaOH(a)\rightarrow Fe(OH)_2(s)+2Na^+(a) \quad \{3\}$$

wherein (a) denotes aqueous phase and (s) denotes solid phase.

A solid matrix of very high percentage of solids in the form of iron hydroxide is achieved thereafter utilizing means known in the art for obtaining a solid matrix with a low percentage of entrained liquid, including, by way of example only and not of limitation, clarification or thickening. The resulting solution from the unit operation selected for obtaining the iron hydroxide solid matrix is fed to the iron (III) adjustment raffinate pond K via bypass stream 7c.

Upon obtaining the iron hydroxide solid matrix, the matrix is dissolved in an aqueous acidic solution of a pH in the range of 0 to 6.7, which yields a highly concentrated iron (II) aqueous acidic solution which, according to a preferred embodiment of the invention, is fed to the electrochemical reactor feed tank H as iron (II) aqueous feed tank feed stream 4b' as indicated in FIG. 1. The aqueous acidic solution is selected from the group comprising of nitric acid ($HNO_3$) and sulfuric acid ($H_2SO_4$), preferably sulfuric acid. Electrolytic Transformation of Iron (II) to Iron (III) According to the Inventive Process The process of iron (III) production by oxidation of iron (II) to iron (III), in a preferred embodiment of the invention, is sustained by the use of electrolytic membrane cell technology in an electrochemical reactor. Depending on the alternative chosen for iron concentration stage G, one discharge stream from stage G selected from the group consisting of iron (II) aqueous stream feed tank feed stream 4b (alternative 1) and iron (II) aqueous feed tank feed stream 4b' (alternative 2) is fed to electrochemical reactor feed tank H. Electrochemical reactor feed tank H is a tank, with or without agitation, for containing iron (II)-rich solutions as is known in the art. The contents of electrochemical reactor feed tank H are fed to electrochemical reactor I as electrochemical reactor feed stream 6. Preferably, the concentration of iron (II) in stream 6 fed to electrochemical reactor I is in the range of 50 to 500 g/L.

Alternatively, in addition to one of stream 4b and 4b', if the iron (II) concentration in such stream is insufficient such that the iron (II) concentration of an electrochemical reactor feed stream 6 discharged from electrochemical reactor feed tank H to electrochemical reactor I is below 50 grams of iron (II) per liter (g $Fe^{2+}$/L of solution of electrochemical reactor feed stream 6), iron (II) makeup stream 8 can be introduced into feed tank H to ensure the iron (II) concentration in the feed stream 6 is above 50 g/L.

Iron (II) makeup stream 8 can originate from one of the various methods known in the art of providing an aqueous iron (II) stream. Such external iron (II) supplies can include, by way of example only and not limitation, the (i) leaching of metallic iron in the form of iron dust, metal iron in fine particles or other geometry, or iron ore pellets with sulfuric and/or nitric acid (acid iron leaching), and/or (ii) a highly-concentrated aqueous iron (II) solution. Preferably, the iron (II) concentration in iron (II) makeup stream 8 exceeds 100 g $Fe^{2+}$/L.

In addition to one of stream 4b and 4b' and the optional iron (II) makeup stream 8, concentrated sodium nitrate ($NaNO_3$) aqueous stream 11 is introduced into the electrochemical reactor feed tank H. Concentrated sodium nitrate aqueous stream 11 has a nitrate concentration greater than or equal to 333 g $NO_3^-$/L of solution of stream 11. The concentrated sodium nitrate aqueous stream 11 is dosed into electrochemical reactor feed tank H to achieve a uniform nitrate ion concentration ($NO_3^-$) within tank H of greater than approximately 333 g $NO_3^-$/L of solution within tank H.

Within electrochemical reactor feed tank H, the iron (II) and sodium nitrate ($NaNO_3$) introduced from the above-described feed streams to electrochemical reactor feed tank H are homogenized using methods known in the art for storage tank homogenization of iron (II)-bearing aqueous solutions. The electrochemical reactor feed tank H allows for providing a uniform, homogenous aqueous solution comprised in part of nitrate ($NO_3^-$) and iron (II) ions. The homogenization ensures a more effective transformation and oxidation of iron (II) to iron (III) in the form of aqueous ferric nitrate ($Fe(NO_3)_3$) in electrochemical reactor I.

In addition, use of electrochemical reactor feed tank H allows for optimization of the composition of electrochemical reactor feed stream 6 which in turn allows for the optimization of the chemical conversion of iron (II) to iron (III) so as to reduce the electrical costs and associated operating expenses of effectuating such chemical conversion of iron (II) to iron (III) within electrochemical reactor I. This optimization is achievable through the performance of testing on the copper raffinate solution stream 2b wherein the total copper (II) and iron [iron (II) plus iron (III)] concentrations of an aliquot of the copper raffinate solution stream 2b are measured, specific volumes of nitric acid are added to the aliquot, and the resulting redox potential is measured using techniques known in the art. Typically, the redox potential of the acid/aliquot mixture is lower for lower nitric acid concentrations and reaches a maximum at a certain nitric acid concentration. Examples of such testing for three different aliquots corresponding to copper raffinate solution stream 2b are given below in Table 3, and a figure displaying these results is given in FIG. 2. The feeding of streams to tank H thus, with the performance of such testing, can identify a desired composition of tank H contents so as to ensure a maximum redox potential, thereby in turn improving conversion of iron (II) to iron (III) in electrochemical reactor I.

TABLE 3

Redox Potential as a Function of Nitric Acid Volume Added to Aliquots of Copper Raffinate Solution

| Volume of 68% $HNO_3$ Solution (v/v) | Redox Potential, Copper Raffinate Solution No. 1: $[Cu^{2+}]$ = 0.05 g/L $[Fe_T]$ = 2 g/L (mV [Ag/AgCl]) | Redox Potential, Copper Raffinate Solution No. 2: $[Cu^{2+}]$ = 0.1 g/L $[Fe_T]$ = 5 g/L (mV [Ag/AgCl]) | Redox Potential, Copper Raffinate Solution No. 3: $[Cu^{2+}]$ = 0.07 g/L $[Fe_T]$ = 1.5 g/L (mV [Ag/AgCl]) |
|---|---|---|---|
| 0 | 494 | 395 | 531 |
| 1 | 497 | 401 | 532 |
| 2 | 536 | 406 | 531 |
| 3 | 539 | 410 | 549 |
| 4 | 540 | 414 | 552 |
| 5 | 542 | 417 | 555 |
| 6 | 543 | 420 | 553 |
| 7 | 542 | 423 | 555 |
| 8 | 542 | 425 | 556 |
| 9 | 542 | 427 | 557 |
| 10 | 543 | 428 | 557 |
| 15 | 544 | 436 | 562 |
| 20 | 544 | 442 | 64 |
| 25 | 545 | 447 | 563 |
| 30 | 547 | 452 | 565 |
| 35 | 547 | 456 | 568 |
| 40 | 549 | 459 | 570 |
| 50 | 561 | 467 | 573 |
| 60 | 690 | 471 | 578 |
| 70 | 759 | 476 | 582 |
| 80 | 789 | 486 | 584 |
| 90 | 804 | 492 | 584 |
| 95 | — | 856 | — |
| 100 | 822 | 857 | 807 |

Figure 2:
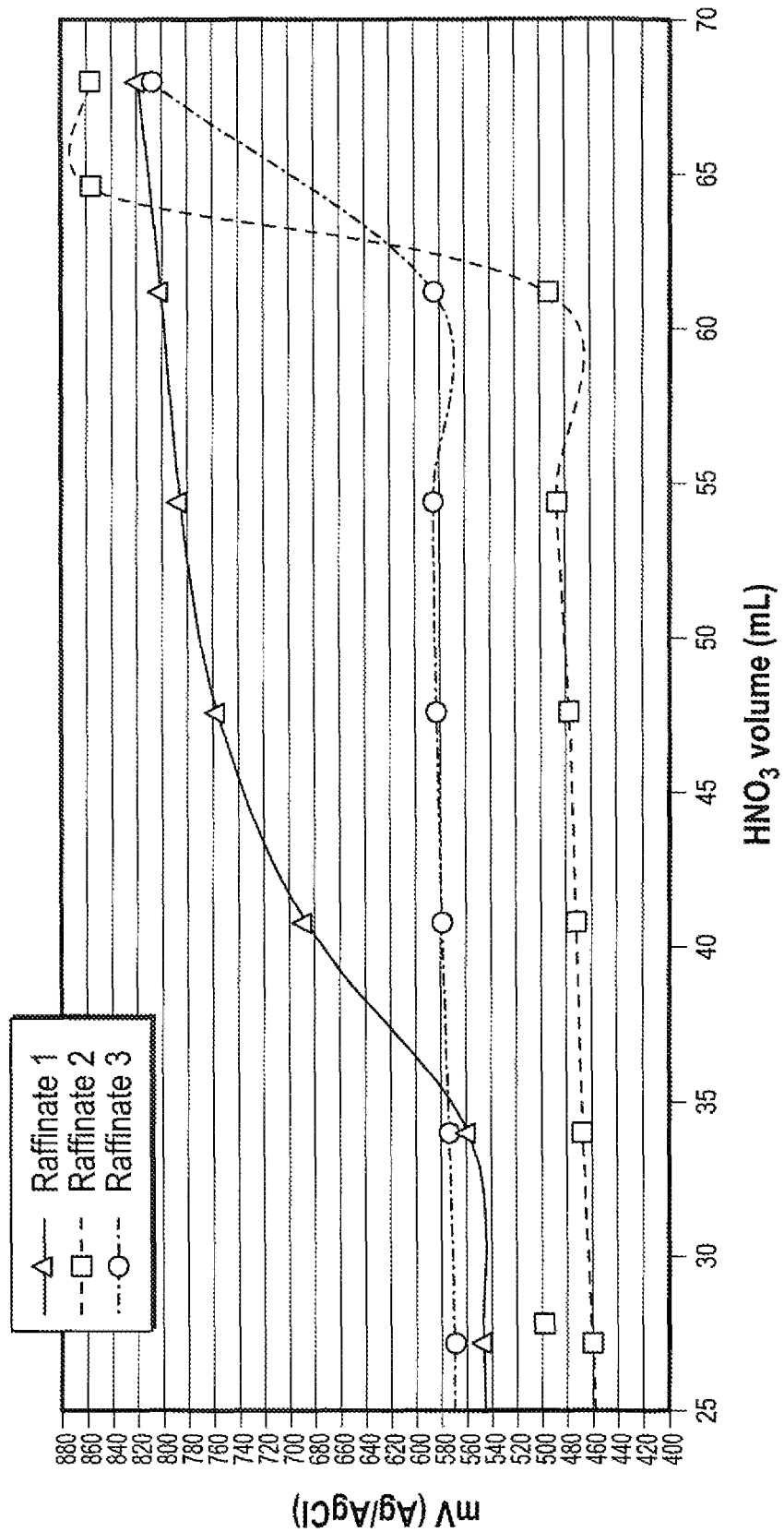
FIG. 2 is a graphical representation of redox potential of copper raffinate solution of known copper (II) and total iron (iron (II) and iron (III)) composition as a function of nitric acid volume added to an aliquot of copper raffinate solution.

As can be gleaned from Table 3 and FIG. 2, the greater the redox potential of the acid/aliquot mixture results in greater chemical conversion of iron (II) to iron (III). Thus, the results of these tests can allow an operator to adjust the acidity of the contents of tank H so as to maximize the chemical conversion of iron (II) to iron (III) occurring therein and simultaneously minimize operating expenses associated with the electricity consumption in electrochemical reactor I.

Alternatively, tank H may include a system known in the art to control organic solvent carryover from alternative 1 of the iron concentration stage G. Said organic solvent control system would preferably ensure separation out of any such organic solvent such that the concentration of organic solvent in electrochemical reactor feed stream 6 does not exceed 10 ppm. Such organic solvent control systems include by way of example only and not of limitation, a solid/liquid gravity-based settling system.

From electrochemical feed tank H, electrochemical reactor feed stream 6 is fed to electrochemical reactor I. Although not a requirement for the performance of the process according to the invention, typical flow rates of feed stream 6 preferably are in the range of 500 to 1,000 cubic meters of solution of per hour per electrolytic membrane cell (500-1,000 $m^3$/hr-cell).

Figure 3:
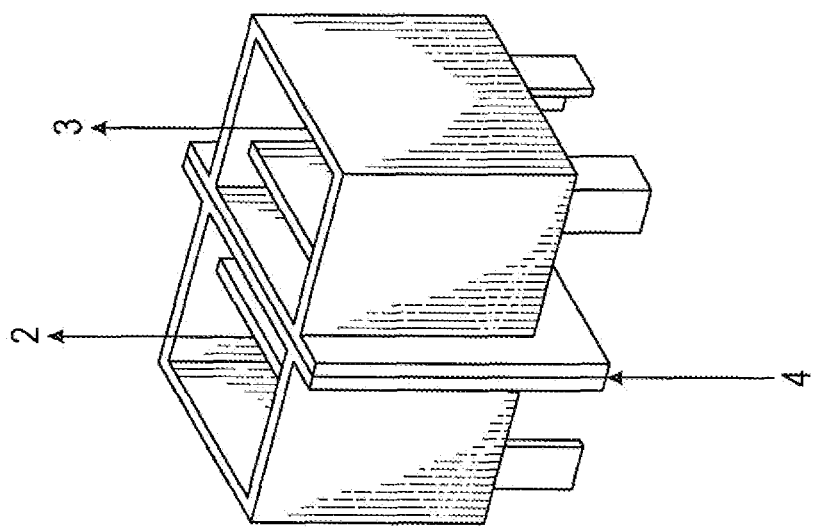
FIG. 3 is a depiction of the electrochemical reactor used in a preferred embodiment of a process for preparing a ferric nitrate reagent from copper raffinate solution from a copper ore hydrometallurgical process according to the invention.

FIG. 3 is a representation of a preferred embodiment of the invention where an electrochemical reactor I is used in the process according to the invention. Electrochemical reactor I is comprised of at least one electrolytic membrane cell comprised of a first compartment 2 and a second compartment 3 separated from first compartment 2 by membrane 4. Membrane 4 can be any perfluorinated membrane known in the art for use in electrolytic membrane cells under acidic conditions that is permeable to sodium ions ($Na^+$) to allow the passage of sodium ions from the anodic solution to the cathodic solution. The ability of membrane 4 to operate under acidic conditions is important for performing the process according to the invention since the pH of the electrochemical reactor feed stream 6 is acidic, with a pH that does not exceed 1. Preferably, membrane 4 is a model 324 Nafion perfluorinated membrane commercialized by E.I. DuPont de Nemours or similar. Preferably, and additionally, membrane 4 is reinforced with a support string on the base material. Furthermore, and preferably, membrane 4 is pretreated using techniques known in the art to expand its surface area before energizing the electrodes in the one or more electrolytic membrane cells within electrochemical reactor I.

An anode (not depicted in FIG. 3) is contained within first compartment 2. Said anode is any anode known in the art capable of oxidizing aqueous iron (II) ions ($Fe^{2+}$) to iron (III) ($Fe^{3+}$). Preferably, the anode in first compartment 2 is a dimensionally-stable anode (DSA) characterized in having a large surface area. Additionally, and preferably, said anode in first compartment 2 comprises a titanium (Ti) mesh DSA coated with a mixture of titanium oxides ($TiO_x$) and oxides of noble metals such as ruthenium oxides ($RuO_x$) and iridium oxides ($IrO_x$). Said metallic oxides serve as catalysts for the reactions taking place at the anode, including the oxidation of iron (II) to iron (III). The coating of the anode, as is often required and understood in the art, may require changing from time to time according to the actual operating conditions.

Within second compartment 3 is a cathode (not depicted in FIG. 3). Said cathode is any cathode known in the art capable of reducing water and producing sodium hydroxide (NaOH) under the conditions according to the process of the invention. Preferably, said cathode is a cathode which complies with the ASTM B160 Standard and is made of a nickel (Ni) mesh material. Additionally, and preferably, said cathode is comprised of Nickel 200 or another form of metallic nickel with a nickel content by weight of at least 99%.

Table 4 shows some features and advantages of the electrodes and membrane used in the electrochemical reactor I, according to a preferred embodiment of the invention.

TABLE 4

Features and Advantages of the Electrodes and Membrane that May Be Used in One Embodiment of The Electrochemical Reactor

| Material | Preferred Features of Components of Electrochemical Reactor I | Advantages of Such Preferred Features |
|---|---|---|
| Anode | Dimensionally-Stable Anode (DSA). Large surface electrodes, Titanium mesh, coated with a mixture of Titanium oxides and oxides of noble metals (Ru, Ir). A change of coating must be considered from time to time, according to operation conditions. Low specific energy consumption, due to the decrease in the overvoltage of iron (II) oxidation. | Dimensionally stable and non-consumable, thus allowing the operation at high flow densities. The coating has an estimated 3-year service life. Light weight. Improves electrolyte recirculation due to its mesh shape. The average inter-electrode distance decreases, thus favoring the energy consumption. |
| Cathode | Nickel Meshes. Nickel 200-99% Ni minimum content. ASTM B160 Standard. Long duration under operation conditions. | Effective catalyst of water reduction reaction. Good chemical stability. Relative low cost. |
| Membrane | Thin polymer film, commonly reinforced with a support string on the Teflon base. Requires expansion pretreatment before energizing. Allows working under high acidity conditions of the medium. | Permeable to the passage of $Na^+$ ions from Anode to Cathode. Waterproof to other cations or anions and to non-polar compounds. |

Various experiments of the process according to the invention were conducted wherein the dimensions of electrochemical reactor I were as set forth in Table 5:

TABLE 5

Dimensions of Electrochemical Reactor I Used in Laboratory/Pilot-Scale Experiments of the Process According to the Invention

| Electrochemical Reactor Property | Dimension |
|---|---|
| DSA anode geometric area | 0.5 m² |
| Nickel cathode geometric area | 0.5 m² |
| Membrane Height | 0.97 m |
| Membrane geometric area | Slightly less than 0.5 m² |

Figure 4:
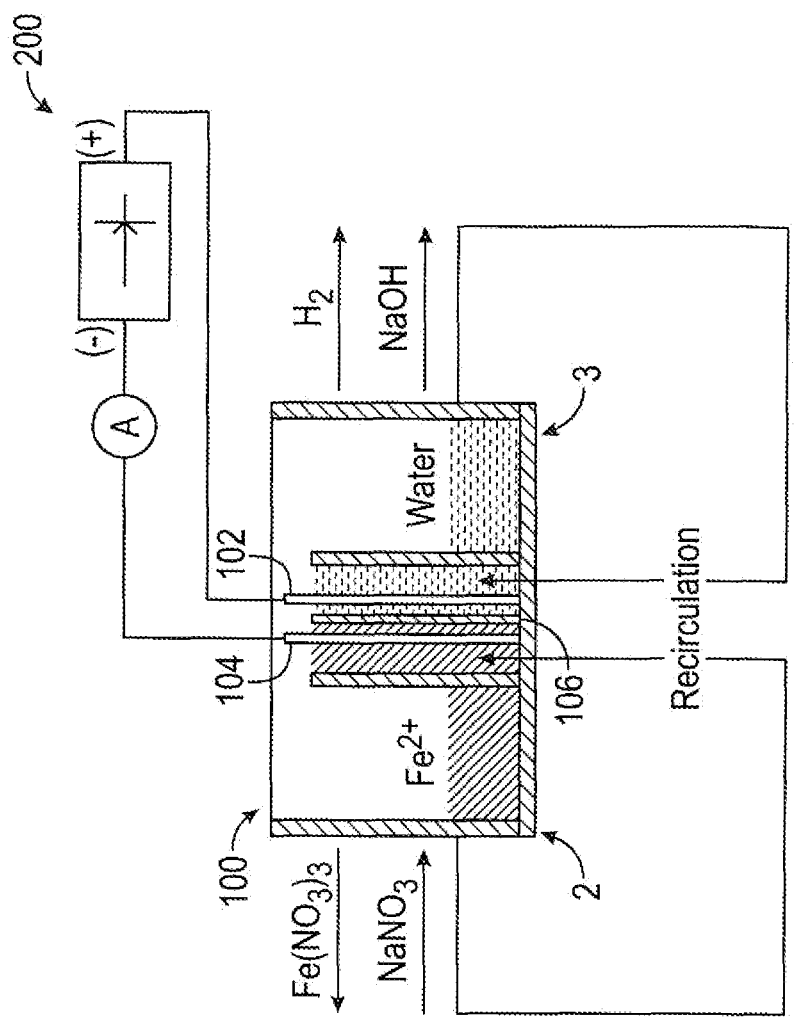
FIG. 4 is a depiction of a length-wise section of the electrolytic membrane cell, electrode distribution, membrane location, and electrical connection within the electrochemical reactor used in a preferred embodiment of a process for preparing a ferric nitrate reagent from copper raffinate solution from a copper ore hydrometallurgical process according to the invention.

With reference to FIG. 4 which depicts a preferred embodiment of an electrolytic membrane cell 100 within electrochemical reactor I, water of a pH of about 4 is supplied to cathode 102 within second compartment 3, while supplying a concentrated aqueous solution of iron (II) and sodium nitrate ($NaNO_3$) to anode 104 within first compartment 2. Cathode 102 and anode 104 are separated by membrane 106. The iron (II)/sodium nitrate solution supplied to anode 104 within first compartment 2 is provided from electrochemical rector feed stream 6. Preferably, a highly concentrated iron (II) solution of electrochemical reactor feed stream 6 of approximately 100 g $Fe^{2+}$/L or greater is supplied to the anode 104 in order to operate at current densities less than 1,000 amperes per square meter of electrode area ($A/m^2$), which allows for a smaller volume for electrochemical reactor I. However, the iron (II) concentration of electrochemical reactor feed stream 6 need not be approximately 100 g $Fe^{2+}$/L or greater in order to perform the process according to the invention, as the minimum iron (II) concentration required in stream 6 is approximately 50 g $Fe^{2+}$/L.

With reference to FIG. 4, an electric charge is applied to electrolytic membrane cell 100 via rectifier 200. This results in a potential difference between cathode 102 and anode 104 of greater than 3 volts, which will oxidize iron (II) in solution in contact with anode 104 within first compartment 2 to iron (III) according to anodic reactions set forth below. Typically, the charge is such that the resulting charge current density in amperes per square meter of surface area of cathode 102 is between 450-500 $A/m^2$. The corresponding electrochemical reaction resulting at cathode 102 in second compartment 3 (also set forth below) is the reduction of water to hydrogen gas and hydroxide ion ($OH^-$) which, due to the presence of sodium ions ($Na^+$) permeating from anode 104 within first compartment 2 through membrane 4 to cathode 106 within second compartment 3, quickly reacts with sodium ions to form sodium hydroxide (NaOH). Said sodium hydroxide can be used in a variety of industrial uses, including, by way of example and not of limitation, as concentrated aqueous sodium hydroxide (NaOH) stream 68 which can be introduced into the precipitation stage GG2 of the iron concentration stage alternative 2 to effectuate the precipitation of iron (II) as iron hydroxide ($Fe(OH)_2$).

Cathode Reactions:

In the cathode 100, water is reduced to the hydroxide ion and hydrogen gas is evolved. In addition, sodium hydroxide is generated as a product by the reaction between sodium ions which permeate from anode 104 and the hydroxide ion produced from the reduction of water.

$$\text{Water Reduction: } H_2O + e^- \rightarrow \tfrac{1}{2}H_2(g) + OH^- \quad E° = -0.83 \text{ V (SHE)} \quad \{4\}$$

$$\text{Sodium Hydroxide Production: } Na^+ + OH^- \rightarrow NaOH \quad \{5\}$$

The overall cathode reaction is:

$$H_2O + e^- + Na^+ \rightarrow NaOH + \tfrac{1}{2}H_2(g) \quad \{6\}$$

Anode Reactions:

In the anode, iron (II) is oxidized to iron (III).

$$\text{Ferrous Ion Oxidation: } Fe^{2+} \rightarrow Fe^{3+} + e^- \quad E° = -0.76 \text{ V (SHE)} \quad \{7\}$$

The iron (II) fed to the electrochemical reactor I in electrochemical reactor feed stream 6 preferably is in the form of ferrous nitrate ($Fe(NO_3)_2$). As such, the ferrous ion oxidation half reaction occurring at anode 104 is the following:

$$Fe(NO_3)_2 + NaNO_3 \rightarrow Fe(NO_3)_3 + Na^+ + e^- \quad \{8\}$$

Combining the anode reaction {8} with cathode reaction {6} yields the overall electrochemical reaction {9} set forth below:

$$H_2O + Fe(NO_3)_2 + NaNO_3 \rightarrow Fe(NO_3)_3 + NaOH + \tfrac{1}{2}H_2(g) \quad \{9\}$$

A feature of the invention is that the following anodic reaction (Reaction {10}) will not occur since the iron (II) concentration at anode 104 is 100 g $Fe^{2+}$/L or greater and, as such, Reaction {7} occurs instead:

$$2H_2O \rightarrow O_2 + 4H^+ + 4e^- \quad E° = -1.23 \text{ V (SHE)} \quad \{10\}$$

Hydrogen gas ($H_2$) produced at cathode 102 is captured and stored. Ferric nitrate ($Fe(NO_3)_3$) reagent produced at anode 104 is passed out of electrochemical reactor I as electrochemical reactor discharge stream 7a. Discharge stream 7a preferably has a ferric nitrate concentration of equal to or greater than 246 g $Fe(NO_3)_3$/L of volume of discharge stream 7a. Sodium hydroxide (NaOH) produced at cathode 102 is removed from electrochemical reactor I as a concentrated aqueous sodium hydroxide stream 68 which can be introduced into precipitation state GG2 of the iron concentration stage alternative 2 to effectuate the precipitation of iron (II) as iron hydroxide ($Fe(OH)_2$) should such alternative be implemented in iron concentration phase G.

The following set of experimental data shows the redox potential of ferric nitrate dissolved at different concentrations of nitric acid, with the purpose of incorporating an adequate amount of nitrate to maintain the existence of a redox potential high enough, preferably greater than 780 mV (SHE), as necessary from a thermodynamic standpoint to be used in the heap leaching stage A of a copper ore hydrometallurgical process. The results in Table 6 regarding the production of the ferric nitrate reagent are from the use of commercial iron shavings, wherein iron is provided as iron (II) oxide as a source of iron, with the exception of sample no. 5, which was performed with discarded steel wool with iron provided also as an iron (II) oxide.

TABLE 6

Production of Ferric Nitrate from a Solution of Iron (II) and Nitric Acid

| Sample | $HNO_3$ (g/L) | $Fe^{2+}$ (g/L) | $Fe^{3+}$ (g/L) | Final Redox Potential (mV (Ag/AgCl) (Ag/AgCl reference electrode)) | Transformation Efficiency (% conversion of Iron (II) to Iron (III)) |
|---|---|---|---|---|---|
| 1 | Drops | 0.2 | 0.01 | 520 | 5.0% |
| 2 | 200 | 40.6 | 34.30 | 525 | 84.5% |
| 3 | 300 | 21.6 | 20.30 | 740 | 94.0% |
| 4 | 400 | 32.5 | 30.50 | 856 | 93.8% |
| 5 | 400 | 32.4 | 23.60 | 862 | 72.8% |

Experiments were also performed simulating the electrochemical reaction which preferably occurs in electrochemical reactor I, wherein nitric acid ($HNO_3$), sodium nitrate ($NaNO_3$) and, as needed, iron (II) ($Fe^{2+}$), were added to an aqueous iron-bearing solution obtained from a copper ore hydrometallurgical process. The results are provided in Table 7 wherein the $E°$ of the $Fe^{3+}/Fe^{2+}$ system is 770 mV (SHE).

TABLE 7

Synthesis of Ferric Nitrate in Electrochemical Reactor I

| Sample | $Fe_{Total}$ (g/L) | pH | $Fe^{3+}/Fe_{Total}$ | Redox Potential of Ferric Nitrate Reagent Produced (mV (SHE)) |
|---|---|---|---|---|
| 1 | 1 | 2.3 | 25% | 490 |
| 2 | 30 | 0.3 | 99% | 784 |
| 3 | 40 | 0.2 | 99% | 820 |
| 4 | 50 | 0.2 | 99% | 940 |

With the exception of Sample 1, the redox potential of the ferric nitrate reagent produced was greater than 770 mV (SHE), which is the $E°$ of the $Fe^{3+}/Fe^{2+}$ system. The data reveals that greater nitric acid and iron (II) concentrations result in highly concentrated iron (III) solutions with redox potentials in excess of 850 mV (Ag/AgCl) (Ag/AgCl reference electrode), as achieved in Sample 4, which would provide a ferric nitrate reagent with a high oxidizing power to favor the leaching of metal sulfides during the heap leaching stage A, ore curing and ROM leaching, including, by way of example only and not of limitation, copper concentrate, copper tailings, smelting slags, and/or dust process products using a ferric nitrate reagent produced from the oxidation of iron (II) to iron (III) ($Fe^{3+}$) of a copper ore hydrometallurgical process.

Examples of the Claimed Process

Examples 1, 2 and 3 set forth in Table 8 provide the details of the methodology used for the design of operational variables controlling the production of the ferric nitrate reagent in a preferred embodiment of the invention. For these examples, the leaching time selected was 8 hours with a rate of 85 L/h to obtain a net volume of 680 L heap leaching solution generated. The total current applied to cathode 102 was 587 A, and the specific energy consumed was 2,253 kW/ton of $Fe(NO_3)_3$.

In the three examples set forth in Table 8, a highly concentrated iron (III) solution is produced in anode 104 of reactor I, with a 100 g/L concentration of total iron (iron (II) plus iron (III)) fed to reactor I. In cathode 102 within second compartment 3, a highly-concentrated aqueous sodium hydroxide (NaOH) is produced, which can be stored and subsequently used in other plant processes such as in the precipitation stage GG1 of alternative 2 of the iron concentration stage G if such alternative is chosen.

TABLE 8

Operational Variables

| | | | EXAMPLE | | |
|---|---|---|---|---|---|
| | | | 1 | 2 | 3 |
| Aqueous-phase iron (II) concentration solution feed to electrochemical reactor (Stream 6) | Flow | L/h | 4 | 4 | 9 |
| | [$Fe^{2+}$] | g/L | 100 | 100 | 100 |
| Electrochemical reactor discharge (Stream 7a) | [$Fe^{2+}$] | g/L | 60 | 21 | 60 |
| | [$Fe^{3+}$] | g/L | 40 | 79 | 40 |
| Copper raffinate solution (Stream 2b) | Flow | L/h | 81 | 81 | 76 |
| | [$Fe^{2+}$] | g/L | 1.5 | 1.5 | 1.5 |
| | [$Fe^{3+}$] | g/L | 1.0 | 1.0 | 1.0 |

TABLE 8-continued

Operational Variables

| | | | EXAMPLE | | |
|---|---|---|---|---|---|
| | | | 1 | 2 | 3 |
| Heap Leaching Solution (Stream 1) | Flow | L/h | 85 | 85 | 85 |
| | [$Fe^{2+}$] | g/L | 4.5 | 2.5 | 7.5 |
| | [$Fe^{3+}$] | g/L | 3.0 | 5.0 | 5.0 |
| Parameters of Electrochemical Reactor I | Charge applied to cathode 102 | A/m² | 470 | 470 | 470 |
| | η (Electrical Charge Efficiency) | % | 85 | 85 | 85 |
| | Iron (III) conversion percentage | % | 40 | 79 | 40 |
| | Anode Area | m² | 1.25 | 1.25 | 1.25 |
| | Iron (III) Generated | G | 1.395 | 2.755 | 2.790 |
| Recirculation Time | | h | 1.34 | 2.64 | 2.68 |
| Sodium Nitrate Concentration (Stream 68) | | g/L | 456 | 456 | 456 |

For any of the process streams or unit operations used in any embodiment of the invention, the monitoring of the parameters of such streams or unit operations, such as, by way of example and not of limitation, the temperature, pressure, flow rate, concentration of stream constituents, redox potential, and other physical-chemical characteristics can be performed, either on a continuous or non-continuous basis as is generally known in the art.

Use of Ferric Nitrate in the Heap Leaching and/or Ore Curing Stages of a Copper Ore Hydrometallurgical Process A mixture of ferric nitrate reagent produced according to the electrochemical reaction discussed herein, sulfuric acid, water, and aqueous copper raffinate solution can be used in the heap leaching stage A of a copper hydrometallurgical process. Preferably, in one embodiment of the invention, discharge stream 7a is fed to ferric nitrate reagent storage tank J. When ferric nitrate is required for use in heap leaching stage A of the copper ore hydrometallurgical process, ferric nitrate is fed from tank J as ferric nitrate storage tank discharge stream 7b to iron (III) adjustment raffinate pond K into which, as discussed above, is also introduced diverted stream 3 from flow diverter operation F, alternatively iron (II)-poor aqueous discharge stream 5 from first extraction stage G1 of alternative 1 of iron concentration stage G, and alternatively water make-up stream 9 as needed to ensure the proper solution inventory within pond K and level of aqueous solution within heap leaching stage A. The ferric nitrate concentration within pond K preferably is in the range of 4 to 6 g total iron {$Fe^{2+}+Fe^{3+}$}/L. The desired ferric nitrate concentration in pond K, however, is determined as dictated by the needs of the specific copper ore hydrometallurgical process through column tests, the performance of which is commonly understood and known in the art. Upon achieving the proper ferric nitrate concentration as dictated by the specific copper ore hydrometallurgical process, ferric nitrate reagent stream 10 is introduced into the heap leaching stage A of the copper ore hydrometallurgical process to improve the oxidation and leaching of copper sulfides in sulfur-bearing copper ores.

The ferric nitrate reagent produced pursuant to the process of the invention also may be introduced, without any dilution, into the ore curing stage B of the copper ore hydrometallurgical process as ferric nitrate reagent stream 12 from storage tank J, along with a concentrated aqueous sulfuric acid ($H_2SO_4$) stream 13, and one of copper raffinate solution from the copper organic solvent extraction stage D or water. The use of ferric nitrate significantly improves the copper recovery achieved during the ore curing stage B of the copper ore hydrometallurgical process. The output of ore curing stage B is fed as stream 14 to heap leaching stage A. Moreover, it should also be noted that the ferric nitrate reagent used in ore curing stage B, when such dosing is performed before adequate volumes of ferric nitrate reagent have been produced in electrochemical reactor I according to the process of the invention, may be provided by the dissolution of metallic iron (i.e., iron (0)) in nitric acid ($HNO_3$) and then introduction of the ferric nitrate produced thereby into ore curing stage B along with sulfuric acid.

Preferably, the iron (III) concentration determined to be necessary for heap leaching solution ferric nitrate reagent stream 10 fed to heap leaching stage A is determined by the performance of column leaching tests under different operational conditions of a copper ore as is commonly understood and performed in the art. Upon the performance of such tests, the iron (III) concentration of stream 10 required for heap leaching stage A can be determined, which, along with heap leaching solution stream 1 which emerges from the heap leaching stage A, are used to determine the design and volume of the electrochemical reactor I and the flow rates of the streams used in the process of the invention. The operating mode of electrochemical reactor I, namely, whether reactor I is run as a continuous feed reactor or a batch reactor, depends on the requirements of the heap leaching stage A of the copper ore hydrometallurgical process, namely, whether stage A is performed continuously or on a batch-wise basis.

Table 9 below shows the results of six column leaching tests (two each on three different copper ores) performed which demonstrates the effectiveness of use of ferric nitrate reagent produced according to the process of the invention in heap leaching stage A. Each sample comprised a measured mass of an ore with a known chemical composition, with copper content ranging from 0.7% to 1% copper by mass. In each test, the solid material was exposed to a synthetic solution with a composition resembling that of copper raffinate solution commonly found in the copper mining industry from copper organic solvent extraction akin to the copper raffinate solution stream 2b of a preferred embodiment of the invention as described herein. For each of the three solid minerals tested, one column leach test was performed wherein only sulfuric acid was contacted with the solid mineral (denominated Samples 1A, 2A, and 3A) and a second column leach test was performed wherein both sulfuric acid and ferric nitrate were contacted with the same solid mineral (denominated Samples 1B, 2B, and 3B). In this way, any difference in copper extraction performance between sulfuric acid only and sulfuric acid and ferric nitrate is attributable as a result of ferric nitrate.

The contact time was 100 days for all mineral types except for mineral type 1, which had a contact time of 108 days. After this exposure time, the solid residue was washed with a measured volume of water and the solid residue removed for copper (II) chemical assay testing using methods known in the art. During the 100 or more days, the daily drainage solution, akin to a pregnant leaching solution, was collected and, at the end of the contact time, an aliquot was taken from such collected solution from which copper (II) chemical assay testing was performed using methods known in the art. Three different methods of determining copper recovery from leaching tests of solid minerals known in the art were used (including the solution/head ratio, solution/

(solution+residues) ratio, and the (head —residues)/head ratio), as well as a fourth "adjustment" method which accounts for distinctions between the three different methods. The difference in copper recovery with and without ferric nitrate for all three copper ore sample types was significant, with increased copper recovery of approximately 20% for mineral 2 and 3 and a little more than 30% for mineral 1.

Figure 5:
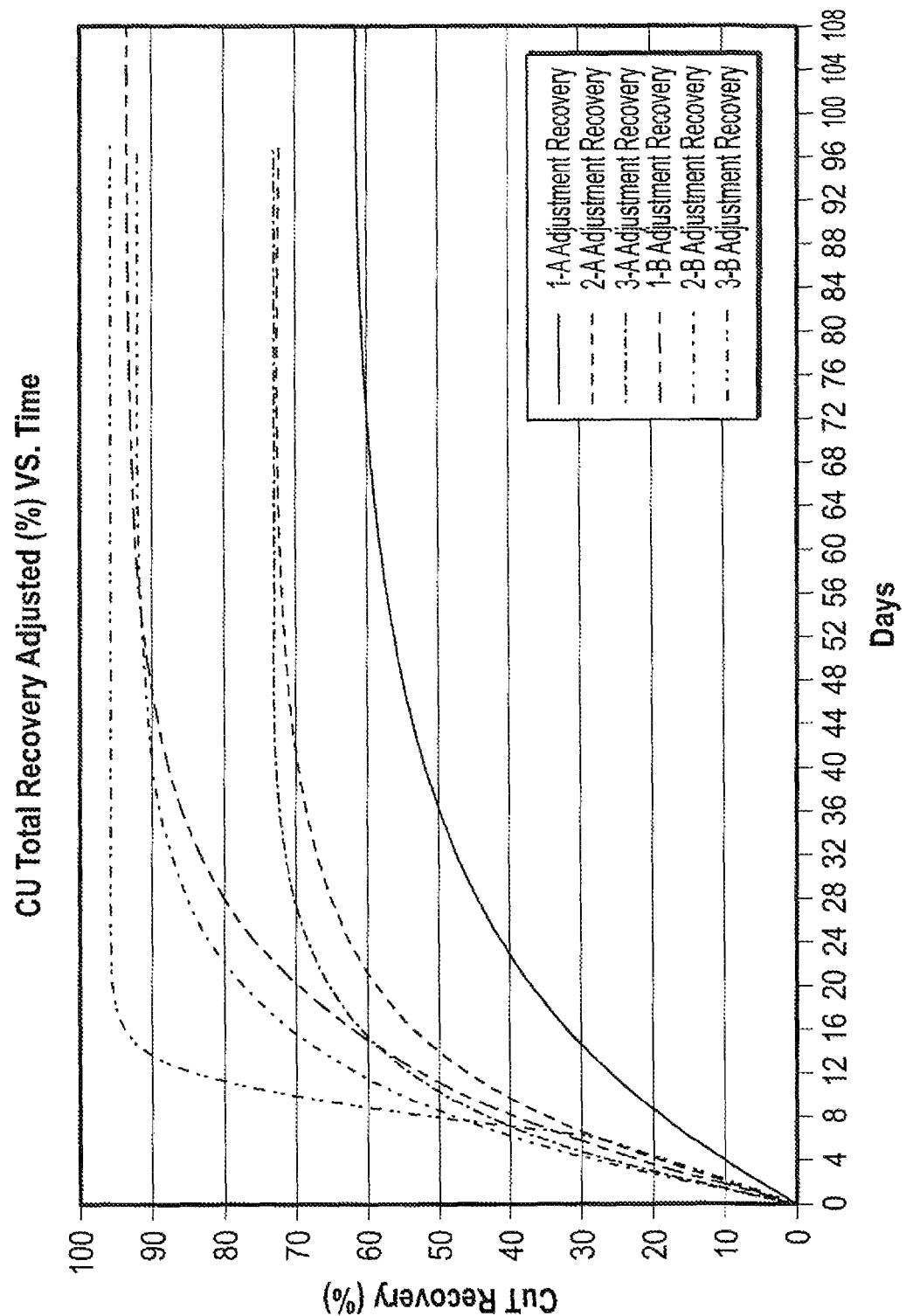
FIG. 5 is a graphical representation of copper recovery kinetics (as a percentage of the total amount of copper recovered from a copper ore sample at any point in time during a contact time period of at least 100 days) over the course of the contact time period for copper ore samples exposed to sulfuric acid only or sulfuric acid and ferric nitrate produced according to the process of the invention.

FIG. 5 shows the total copper recovery for the entire contact time period as a percentage of the total amount of copper recovered from a copper ore sample at any point in time during the contact time as determined by the "adjustment" method for three different mineral types (1, 2, and 3), with samples denominated 1A, 2A, and 3A corresponding to contact of the mineral with sulfuric acid only, and samples 1B, 2B, and 3B corresponding to contact of the mineral with sulfuric acid and ferric nitrate reagent produced by the process of the invention. As depicted therein, significantly higher copper recovery throughout the entire contact time period was obtained for each of the three mineral types when the mineral was contacted with both ferric nitrate and sulfuric acid versus sulfuric acid alone.

TABLE 9

Total Copper Recovery as Measured by Three Distinct Measurement Methods and a Fourth Adjustment Method between the Three Methods

| Sample | Solution to Head Ratio (%) | Solution/ (Solution + Residues) Ratio (%) | (Head-Residues)/ Head Ratio (%) | Adjustment Method (%) | Difference in Copper Recovery with Addition of Ferric Nitrate |
|---|---|---|---|---|---|
| Mineral 1 | | | | | |
| 1A | 66.4 | 62.2 | 59.6 | 61.7 | 31.9 |
| 1B with Ferric Nitrate | 87.1 | 93.3 | 93.8 | 93.6 | |
| Mineral 2 | | | | | |
| 2A | 70.4 | 72.2 | 72.9 | 72.4 | 19.8 |
| 2B with Ferric Nitrate | 92.7 | 92.2 | 92.2 | 92.2 | |
| Mineral 3 | | | | | |
| 3A | 71.8 | 73.2 | 73.7 | 73.3 | 22.7 |
| 3B With Ferric Nitrate | 95.8 | 96.0 | 96.1 | 96.0 | |

With respect to ore curing stage B, experimental results comprised of four samples were performed in which it was discovered that the dosing of 1 to 2.5 kg of ferric nitrate reagent per metric ton of sulfur-bearing copper ore to be cured in ore curing stage B along with up to 15 kg of sulfuric acid per metric ton of sulfur-bearing copper ore to be cured in ore curing stage B increased the copper recovery achieved in ore curing stage B by a factor of 4 to 6 compared to ore curing performed without ferric nitrate. These results indicate that the presence of ferric nitrate in the ore curing stage B, with its high redox potential, improves the oxidation of the sulfur-bearing copper ore, which in turn improves the chemical dissolution of copper in stage B after a period of 48 to 96 hours from the time of introduction of the sulfuric acid and ferric nitrate to ore curing stage B.

Table 10, comprised of Tables 10a and 10b, shows the results of these ore curing tests. During these tests, test samples comprised of a measured mass of a mineral with known chemical composition were contacted with a synthetic solution with a composition resembling that of copper raffinate solution commonly found in the copper mining industry from copper organic solvent extraction (e.g., copper raffinate solution stream 2b of a preferred embodiment of the invention as described herein). Varying dosages of sulfuric acid ($H_2SO_4$) and ferric nitrate reagent ($Fe(NO_3)_3$) are contacted with the test sample for forty-eight (48) hours. After this exposure time period, the test sample is washed with a measured volume of water. The wash water is collected, and an aliquot from the wash water is taken, from which is subsequently determined the extracted copper (II) content using techniques known in the art. Table 10 below shows the results of the tests performed on four test samples.

TABLE 10a

Ore Curing Tests for Samples 1A and 1B

| | Sample 1A | | | Sample 1B | | |
|---|---|---|---|---|---|---|
| | No Ferric Nitrate | | | | | |
| $H_2SO_4$ (Kg/Ton Mineral) | 5 | 10 | 15 | 5 | 10 | 15 |
| $Fe(NO_3)_3$ (Kg/Ton Mineral) | 0 | 0 | 0 | 0 | 0 | 0 |
| Cu Recovery (%) | 9.63 | 18.41 | 19.29 | 3.83 | 3.55 | 4.59 |
| Low Level of Ferric Nitrate (0.85 kg/ton mineral) | | | | | | |
| $H_2SO_4$ (Kg/Ton Mineral) | 5 | 10 | 15 | 5 | 10 | 15 |
| Cu Recovery (%) | 18.29 | 24.7 | 29.89 | 5.93 | 8.47 | 14.42 |
| Copper Recovery Improvement Factor over No Ferric Nitrate | 1.9 | 1.3 | 1.5 | 1.5 | 2.4 | 3.1 |
| Medium Level of Ferric Nitrate (1.5 kg/ton mineral) | | | | | | |
| $H_2SO_4$ (Kg/Ton Mineral) | 5 | 10 | 15 | 5 | 10 | 15 |
| Cu Recovery (%) | 23.24 | 26.35 | 32.61 | 9.69 | 14.47 | 22.66 |
| Copper Recovery Improvement Factor over No Ferric Nitrate | 2.4 | 1.4 | 1.7 | 2.5 | 4.1 | 4.9 |
| High Level of Ferric Nitrate (2.5 kg/ton mineral) | | | | | | |
| $H_2SO_4$ (Kg/Ton Mineral) | 5 | 10 | 15 | 5 | 10 | 15 |
| Cu Recovery (%) | 24.83 | 27.15 | 33.03 | 11.85 | 16.48 | 27.65 |
| Copper Recovery Improvement Factor over No Ferric Nitrate | 2.6 | 1.5 | 1.7 | 3.1 | 4.6 | 6.0 |

TABLE 10b

Ore Curing Tests for Samples 2 and 3

| | Sample 2 | | | Sample 3 | | |
|---|---|---|---|---|---|---|
| | No Ferric Nitrate | | | | | |
| $H_2SO_4$ (Kg/Ton Mineral) | 5 | 10 | 15 | 5 | 10 | 15 |
| Cu Recovery (%) | 0.68 | 0.92 | 0.89 | 1.51 | 1.95 | 2.67 |
| Low Level of Ferric Nitrate (0.85 kg/ton mineral) | | | | | | |
| $H_2SO_4$ (Kg/Ton Mineral) | 5 | 10 | 15 | 5 | 10 | 15 |
| Cu Recovery (%) | 2.69 | 3.11 | 3.19 | 4.15 | 6.97 | 8.58 |
| Copper Recovery Improvement Factor over No Ferric Nitrate | 4.0 | 3.4 | 3.6 | 2.7 | 3.6 | 3.2 |

TABLE 10b-continued

Ore Curing Tests for Samples 2 and 3

|  | Sample 2 | | | Sample 3 | | |
|---|---|---|---|---|---|---|
| Medium Level of Ferric Nitrate (1.5 kg/ton mineral) | | | | | | |
| $H_2SO_4$ (Kg/Ton Mineral) | 5 | 10 | 15 | 5 | 10 | 15 |
| Cu Recovery (%) | 3.38 | 4.82 | 5.23 | 4.85 | 12.13 | 13.12 |
| Copper Recovery Improvement Factor over No Ferric Nitrate | 5.0 | 5.2 | 5.9 | 3.2 | 6.2 | 4.9 |
| High Level of Ferric Nitrate (2.5 kg/ton mineral) | | | | | | |
| $H_2SO_4$ (Kg/Ton Mineral) | 5 | 10 | 15 | 5 | 10 | 15 |
| Cu Recovery (%) | 4.37 | 4.6 | 5.68 | 10.59 | 12.66 | 15.69 |
| Copper Recovery Improvement Factor over No Ferric Nitrate | 6.4 | 5 | 6.4 | 7 | 6.5 | 5.9 |

The results in Table 10a and 10b indicate that in a wide range of copper sulfide ore grade, the copper recovery with ferric nitrate and sulfuric acid exceeds that of sulfuric acid alone by a factor of up to 7.

The superior recovery of copper from a mineral mass in the ore curing stage B when ferric nitrate reagent produced according to the process of the invention is used in conjunction with sulfuric acid is further illustrated by tests performed on minerals of various particle sizes, the results of which are set forth below in Table 11. Ore curing was performed on minerals of three particle sizes (½ inch, ¾ inch, and 1 inch average particle diameter). Typically, smaller particle sizes are preferred in the ore curing process since copper recovery is improved by exposure of sulfuric acid to smaller particles. However, the energy consumed in crushing mineral materials to produce a small average particle diameter of the crushed material treated in the ore curing process is a major cost factor in mineral processing operations which could be reduced if a more effective chemical treatment during the ore curing process were implemented. The results in Table 11 show that such a goal is achievable with joint use of sulfuric acid and ferric nitrate reagent produced according to the process of the invention in the ore curing process. Very high copper (II) recoveries with joint sulfuric acid/ferric nitrate reagent use were observed compared with sulfuric acid alone at all particle sizes.

TABLE 11

Copper Recovery for Various Particle Sizes with and without Ferric Nitrate Reagent

| Ferric Nitrate Reagent Dosage (kg Fe(NO$_3$)$_3$ kg/metric ton of mineral material) | Sulfuric Acid Dosage (kg H$_2$SO$_4$ kg/metric ton of mineral material) | Copper Recovery (%) | Copper Recovery Improvement Factor Over No Ferric Nitrate |
|---|---|---|---|
| ¾ inch average particle diameter | | | |
| 0 | 10.0 | 4.6 | — |
| 0.84 | 10.0 | 23.8 | 5.2 |
| 1.50 | 10.0 | 24.9 | 5.4 |
| 2.54 | 10.0 | 26.6 | 5.8 |
| 1.52 | 15.0 | 24.3 | 5.3 |
| 2.51 | 15.0 | 26.8 | 5.8 |
| ½ inch average particle diameter | | | |
| 0 | 10.0 | 6.7 | — |
| 0.81 | 10.0 | 24.3 | 3.6 |
| 1.54 | 10.0 | 25.5 | 3.8 |
| 2.53 | 10.0 | 25.6 | 3.8 |
| 1.51 | 15.0 | 26.6 | 4 |
| 2.51 | 15.0 | 26.8 | 4 |
| 1 inch average particle diameter | | | |
| 0 | 10.0 | 5.5 | — |
| 0.83 | 10.0 | 18.2 | 3.3 |
| 1.53 | 10.0 | 21.8 | 4 |
| 2.52 | 10.0 | 24.3 | 4.4 |
| 1.51 | 15.0 | 21.7 | 3.9 |
| 2.51 | 15.0 | 24.5 | 4.5 |

For either the heap leaching stage A and/or ore curing stage B, the monitoring of the parameters of the stage, such as, by way of example and not of limitation, the temperature, pressure, flow rate, concentration of stream constituents, redox potential, and other physical-chemical characteristics can be performed, either on a continuous or non-continuous basis as is generally known in the art. This includes monitoring the ferric nitrate reagent concentration in the heap leaching A and/or ore curing stage B so as to detect any change in ferric nitrate concentration therein, which will allow the operator to add ferric nitrate reagent to the respective stage if the ferric nitrate reagent concentration in the respective stage, as measured through monitoring, is below a level determined to be effective for the stage, such level determined for each particular stage according to the materials being processed in such stage.

Use of Ferric Nitrate Reagent in the Leaching of Other Sulfur-Bearing Copper Substances Given the superior copper dissolution and oxidative properties of ferric nitrate, ferric nitrate can also be used in the leaching of other sulfur-bearing copper substances, especially those commonly found in the copper mining industry, in much the same manner as the leaching of copper which occurs in heap leaching stage A. Examples of such substances include, by way of example only and not of limitation, ground rock and process effluents that are generated in a copper ore processing plant such as from ROM leaching, including, by way of example only and not of limitation, old and fresh copper tailings, copper concentrate with or without arsenic (As), copper smelting slags, and copper smelting dust, hereinafter referred to as sulfur-bearing copper substances. The use of the ferric nitrate reagent in the leaching of these substances will increase the copper recovery from such materials.

Figure 6:
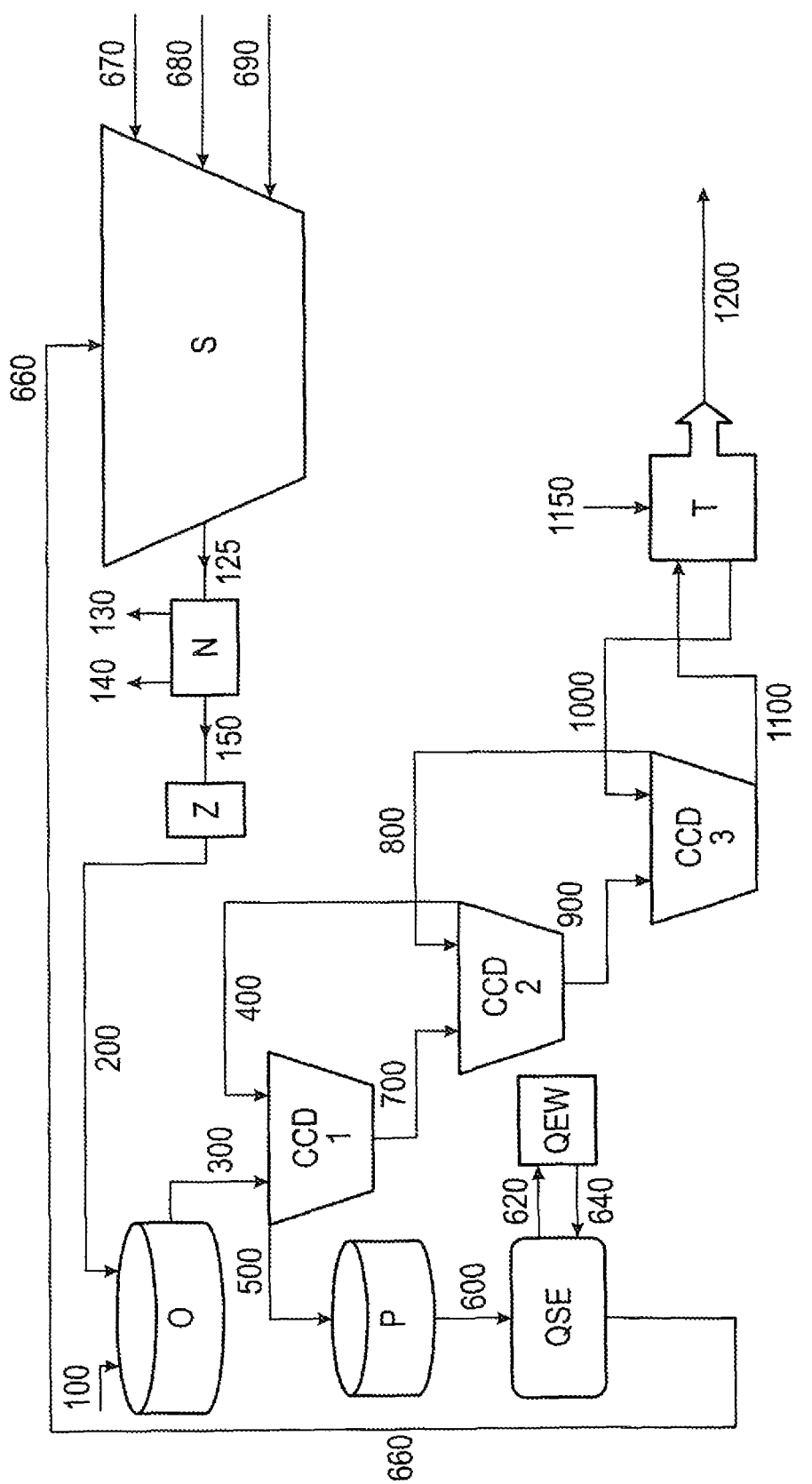
FIG. 6 is a flow chart of a preferred embodiment of a process for treatment of copper concentrates, valuable copper tailings, smelting slags, smelting dust, or other secondary or intermediate materials from a copper ore concentration and/or smelting process using a ferric nitrate reagent produced from a copper raffinate solution from a copper organic solvent extraction process.

A preferred embodiment of a process for treatment of sulfur-bearing copper substances generated from a copper ore concentration and/or smelting process using a ferric nitrate reagent produced from a copper raffinate solution from a copper organic solvent extraction process is depicted in FIG. 6. A stream 100 comprised of an aqueous stream with sulfur-bearing copper mining solids suspended therein is introduced into at least one leaching tank O. An aqueous ferric nitrate stream 200 is also fed to leaching tank O. The contents of tank O are subjected to controlled agitation using methods known in the art to provide agitation to tank contents known to include sulfur-bearing copper substances. Within tank O, the ferric nitrate reagent leaches copper (II) ions ($Cu^{2+}$) from the sulfur-bearing copper mining solids, with the specific leaching reactions dependent on the type of sulfur-bearing copper substances fed to tank O. For example, chalcopyrite ($CuFeS_2$), when fed to tank O as an aqueous stream along with ferric nitrate stream 200 under acidic conditions in the presence of sulfate ions ($SO_4^{2-}$), undergoes the reaction indicated in Reaction {11} wherein iron (III) is reduced to iron (II) and the metallic sulfide $CuFeS_2$ is sulfated to form cupric sulfate:

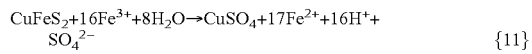
$$CuFeS_2+16Fe^{3+}+8H_2O \rightarrow CuSO_4+17Fe^{2+}+16H^+ + SO_4^{2-} \quad \{11\}$$

Covellite (CuS) undergoes a similar transformation wherein iron (III) is reduced to iron (II) and the cupric sulfide is oxidized to cupric sulfate as indicated in Reaction {12}:

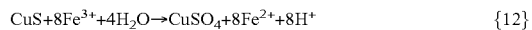
$$CuS+8Fe^{3+}+4H_2O \rightarrow CuSO_4+8Fe^{2+}+8H^+ \quad \{12\}$$

The nitrate present in tank O, which originates from the aqueous ferric nitrate stream 200, maintains the solubility of the compounds so as to prevent the precipitation of minerals such as jarosite, as well as to maintain an elevated redox potential of the ferric nitrate reagent so as to recover a fraction of the iron (III) fed to tank O.

If more than one tank O is used, the tanks are placed in series such that the discharge of the first tank O1 is fed to the second tank O2 positioned in series with first tank O1, with the pattern of series-positioned tanks repeated for any remaining tanks.

Optionally, leaching tank discharge stream 300 from the one or more leaching tank O is then fed to a countercurrent decanter circuit comprised of three countercurrent decanters (CCD1, CCD2, and CCD3), each producing solutions of greater solids content and lower copper concentration. With reference to FIG. 6, leaching tank discharge stream 300 is fed to first countercurrent decanter CCD1. Stream 300 is a stream comprised of a pulp material rich in copper-bearing solid material. Optionally introduced into first countercurrent decanter CCD1 is a recycle stream 400 from the overflow of second countercurrent decanter CCD2. Recycle stream 400 is comprised of solution resulting from the clarification of contents of second countercurrent decanter CCD2. First countercurrent decanter CCD1 allows for the settling out of solution of copper-bearing solid materials and the thickening of such materials. A clarified decanted overflow solution stream with relatively low solid content compared to stream 300 is then discharged from first countercurrent decanter CCD1 as pregnant leaching solution stream 500. Pregnant leaching solution stream 500 contains copper ion (II) ($Cu^{2+}$), amongst other chemical species.

An underflow solution stream 700 is discharged from first countercurrent decanter CCD1 and introduced into second countercurrent decanter CCD2. Optionally introduced into second countercurrent decanter CCD2 is a recycle stream 800 from the overflow of third countercurrent decanter CCD3. Recycle stream 800 is comprised of solution resulting from the clarification of contents of third countercurrent decanter CCD3. Second countercurrent decanter CCD2 allows for continued settling out of solution of copper-bearing solid materials and the thickening of such materials and the production of a relatively thicker, higher-solid content material than produced in first countercurrent decanter CCD1.

An underflow solution stream 900 is discharged from second countercurrent decanter CCD2 and introduced into third countercurrent decanter CCD3. Optionally introduced into third countercurrent decanter CCD3 is a recycle stream 1000 comprised of filtrate from filtration process T located downstream of third countercurrent decanter CCD3. Third countercurrent decanter CCD3 allows for continued settling out of solution of copper-bearing solid materials and the thickening of such materials and the production of a relatively thicker, higher-solid content material than produced in second countercurrent decanter CCD2.

Underflow solution stream 1100 from countercurrent decanter CCD3 is then fed to filtration process T, which consists of one or more filter beds as are known in the art. In filtration process T, aqueous solution stream 1100 is subjected to filtration using methods known in the art for the filtration of solid-bearing aqueous solutions. A makeup water stream 1150 is optionally introduced into filtration process T as needed as a washing stage. Filtrate from filtration process T is recycled to third countercurrent decanter CCD3 as discharge stream 1000. Filtration process T produces a filter cake 1200 which is removed from filtration process T using methods known in the art.

Pregnant leaching solution stream 500 comprised of overflow solution from first countercurrent decanter CCD1 is introduced into pregnant leaching solution (PLS) stage P which in turn provides a pregnant leaching solution (PLS) discharge stream 600 which is fed to a copper organic solvent extraction stage QSE. The copper organic solvent extraction stage QSE extracts copper (II) out of the pregnant leaching solution (PLS) discharge stream 600 through processes known in the art, and feeds a concentrated copper (II) stream to a copper electrowinning (i.e., electrodeposition) process stage QEW via electrowinning feed stream 620. The copper electrowinning process stage QEW provides a discharge stream 640, which is an electrolytic solution commonly found in electrowinning processes as is known in the art, that is fed to the copper organic solvent extraction stage QSE.

The copper organic solvent extraction stage QSE, in addition to producing the electrowinning feed stream 620, provides a copper raffinate solution stream 660 which contains a lower copper (II) concentration relative to the electrowinning feed stream 620. Copper raffinate solution stream 660 is thereafter used in a process for preparing a ferric nitrate ($Fe(NO_3)_3$) reagent for use in the leaching of sulfur-bearing copper substances. Copper raffinate solution 660 is fed to an electrochemical reactor feed tank S, into which is also introduced an acidic aqueous sodium nitrate ($NaNO_3$) stream 670, and an iron (II) ($Fe^{2+}$) makeup solution 680 and optionally a makeup water stream 690. Iron (II) makeup solution 680 can be one of any number of aqueous solutions bearing iron (II), including by way of example and not of limitation, dissolution of iron dust, iron pellets, or iron metal in fines particles.

The electrochemical reactor feed tank S allows for providing a uniform, homogenous aqueous solution comprised in part of nitrate ($NO_3^-$) and iron (II) ions. In addition, to control any organic solvent carryover from copper organic solvent extraction stage QSE, the electrochemical reactor feed tank S preferably includes a system known in the art to ensure separation out of any such organic solvent which may carryover from copper organic solvent extraction stage QSE such that the solvent is not present in the electrochemical reactor feed stream 125 discharged from feed tank S to electrochemical reactor N. Said organic solvent control system would ensure separation out of any such organic solvent such that any stream discharged from tank S would have a concentration of organic solvent that does not exceed 10 ppm. Such organic solvent control systems include by way of example only and not of limitation a solid/liquid gravity-based settling system.

Feed tank S discharges the electrochemical reactor feed stream 125 which is introduced into an electrochemical reactor N. Electrochemical reactor N is comprised of at least one electrolytic cell comprising an anode, cathode, and a membrane separating the anode and cathode, the operation, structure, and other details of which are according to the process of the invention described above. Preferably, if more than one electrolytic cell is used in electrochemical reactor N, the cells are positioned in parallel. Within electrochemical reactor N and as a result of the imposition of an electrical charge, iron (II) ($Fe^{2+}$) is oxidized to iron (III) ($Fe^{3+}$) and reacts with the nitrate ions ($NO_3^-$) in solution to form a concentrated aqueous ferric nitrate ($Fe(NO_3)_3$) reagent. Specifically, the sodium nitrate reacts with the iron (II) in the anodic section of the electrolytic cell(s) of electrochemical reactor N according to Reactions {4} through {9}, thereby oxidizing the iron (II) to iron (III) in the form of ferric nitrate. Other streams produced by the electrochemical reactor N as a result of the electrochemical reaction that takes place therein are a water discharge stream 130 and a concentrated aqueous sodium hydroxide (NaOH) stream 140.

An electrochemical reactor discharge stream 150 that is concentrated in said ferric nitrate reagent is fed to a ferric nitrate reagent storage tank Z. The concentrated ferric nitrate solution is retained in tank Z to be later distributed and dosed in leaching tank O for the leaching of sulfur-bearing copper substances according to the process herein described via stream aqueous ferric nitrate stream 200.

What is claimed is:

1. A process for producing a ferric nitrate reagent for use in a hydrometallurgical process of copper ore containing iron (II) comprising:
   a. Providing an aqueous copper raffinate solution containing iron from a copper organic solvent extraction stage of a copper ore hydrometallurgical process;
   b. Concentrating iron (II) in the aqueous copper raffinate solution;
   c. Forming an iron mixture comprising the concentrated aqueous iron (II) solution and an acidic aqueous sodium nitrate solution;
   d. Feeding the iron mixture to an electrochemical reactor comprising an anode and a cathode and a membrane separating the anode and cathode, wherein an electric charge is applied to the cathode to generate a potential difference between the anode and cathode whereby, through an electrochemical reaction, (i) iron (II) in the iron mixture is oxidized to iron (III) to produce the ferric nitrate reagent, (ii) an aqueous sodium hydroxide solution is produced, and (iii) water is produced;
   e. Forming a ferric nitrate mixture comprising the ferric nitrate reagent, sulfuric acid, and the aqueous copper raffinate solution;
   f. Diluting the ferric nitrate mixture with at least one diluent selected from the group consisting of water, aqueous copper raffinate solution, and an aqueous copper raffinate solution-water mixture;
   g. Dosing the ferric nitrate mixture to a heap leaching stage of a copper ore hydrometallurgical process; and
   h. Dosing the ferric nitrate reagent and sulfuric acid to a copper ore curing stage of a copper ore hydrometallurgical process.

2. The process of claim 1 wherein the concentrating of iron (II) in the aqueous copper raffinate solution is performed by one process selected from the group consisting of (i) an organic solvent extraction process and (ii) a coupled iron oxide precipitation and subsequent solid/liquid separation process.

3. The process of claim 2 wherein the organic solvent extraction process is selected for iron (II) concentration, said organic solvent extraction comprised of a first extraction stage to extract iron (II) from the aqueous to organic phase and a second extraction stage to extract iron (II) from the organic to aqueous phase.

4. The process of claim 3 wherein the first extraction stage comprises the extraction of iron (II) from the aqueous to organic phase through the use of di-(2-ethylhexyl) phosphoric acid dissolved in kerosene.

5. The process of claim 3 wherein a discharge stream from the first extraction stage is used in the formation of the ferric nitrate mixture.

6. The process of claim 2 wherein (i) the coupled iron oxide precipitation and subsequent solid/liquid separation process is selected for iron (II) concentration and (ii) a stream discharged from the solid/liquid separation process is used in the formation of the ferric nitrate mixture.

7. The process of claim 6 wherein the iron oxide precipitation process comprises contacting the aqueous copper raffinate solution with an aqueous copper raffinate solution with an aqueous solution of sodium hydroxide.

8. The process of claim 7 wherein the aqueous sodium hydroxide solution is provided from the aqueous sodium hydroxide solution produced from the electrochemical reaction.

9. The process of claim 2 wherein (i) the coupled iron oxide precipitation and subsequent solid/liquid separation process is selected for iron (II) concentration and (ii) the iron oxide precipitation process comprises contacting the aqueous copper raffinate solution with an aqueous sodium hydroxide solution.

10. The process of claim 9 wherein the aqueous sodium hydroxide solution is provided from the aqueous sodium hydroxide sodium produced from the electrochemical reaction.

11. The process of claim 1 wherein a source of iron (II) in the aqueous iron (II) solution for the iron mixture comprises acid iron leaching of metallic iron.

12. The process of claim 11 wherein the acid used in the acid iron leaching of metallic iron is at least one acid selected from the group consisting of nitric acid and sulfuric acid.

13. The process of claim 1 wherein the source of iron (II) for the iron mixture comprises an aqueous iron sulfate solution.

14. The process of claim 1 further comprising:
   a. Monitoring the ferric nitrate reagent concentration in at least one of the copper ore curing stage and the heap leaching stage; and
   b. Changing the dosing of the ferric nitrate reagent to one or more of the copper ore curing stage and the heap leaching stage if the ferric nitrate reagent concentration, as measured through monitoring, is below a level determined to be effective in such stage.

15. The process of claim 14 wherein the source for the additional ferric nitrate reagent is at least one source selected from the group consisting of ferric nitrate reagent produced from the electrochemical reaction and ferric nitrate reagent produced from dissolution of iron metal with nitric acid.

16. A process for producing a ferric nitrate reagent for use in a hydrometallurgical process of copper ore containing iron (II) comprising:

a. Providing an aqueous copper raffinate solution from a copper organic solvent extraction stage of a hydrometallurgical process;
b. Forming a first mixture comprised of the aqueous copper raffinate solution, an acidic aqueous sodium nitrate solution, and an aqueous iron (II) solution;
c. Feeding the iron mixture to an electrochemical reactor comprising an anode and a cathode and a membrane separating the anode and cathode, wherein an electric charge is applied to the cathode to generate a potential difference between the anode and cathode whereby, through an electrochemical reaction, (i) iron (II) in the iron mixture is oxidized to iron (III) to produce the ferric nitrate reagent, (ii) an aqueous sodium hydroxide solution is produced, and (iii) water is produced;
d. Forming a second mixture comprised of the ferric nitrate reagent and an aqueous solution of sulfur-bearing copper solids suspended therein; and
e. Agitating the second mixture to effectuate the sulfation of the copper in the second mixture so as to form cupric sulfate ($CuSO_4$) and reduce the iron (III) in the ferric nitrate reagent to aqueous iron (II) which is used as a source of the aqueous iron (II) solution for the first mixture.

17. The process of claim 16 wherein a source of iron (II) in the aqueous iron (II) solution for the first mixture comprises acid iron leaching of metallic iron.

18. The process of claim 17 wherein the acid used in the acid iron leaching of metallic iron is at least one acid selected from the group consisting of nitric acid and sulfuric acid.

19. A process for producing a ferric nitrate reagent for use in a hydrometallurgical process of copper ore containing iron (II) comprising:
a. Providing an aqueous copper raffinate solution containing iron from a copper organic solvent extraction stage of a copper ore hydrometallurgical process;
b. Concentrating iron (II) in the aqueous copper raffinate solution;
c. Forming an iron mixture comprising the concentrated aqueous iron (II) solution and an acidic aqueous sodium nitrate solution;
d. Feeding the iron mixture to an electrochemical reactor comprising an anode and a cathode and a membrane separating the anode and cathode, wherein an electric charge is applied to the cathode to generate a potential difference between the anode and cathode whereby, through an electrochemical reaction, (i) iron (II) in the iron mixture is oxidized to iron (III) to produce the ferric nitrate reagent, (ii) an aqueous sodium hydroxide solution is produced, and (iii) water is produced; and
e. Dosing the ferric nitrate mixture to a heap leaching stage of a copper ore hydrometallurgical process.

20. The process of claim 19 wherein the concentrating of iron (II) in the aqueous copper raffinate solution is performed by one process selected from the group consisting of (i) an organic solvent extraction process and (ii) a coupled iron oxide precipitation and subsequent solid/liquid separation process.

21. The process of claim 20 wherein the organic solvent extraction process is selected for iron (II) concentration, said organic solvent extraction comprised of a first extraction stage to extract iron (II) from the aqueous to organic phase and a second extraction stage to extract iron (II) from the organic to aqueous phase.

22. The process of claim 21 wherein the first extraction stage comprises the extraction of iron (II) from the aqueous to organic phase through the use of di-(2-ethylhexyl) phosphoric acid dissolved in kerosene.

23. The process of claim 21 wherein a discharge stream from the first extraction stage is used in the formation of the ferric nitrate mixture.

24. The process of claim 20 wherein (i) the coupled iron oxide precipitation and subsequent solid/liquid separation process is selected for iron (II) concentration and (ii) a stream discharged from the solid/liquid separation process is used in the formation of the ferric nitrate mixture.

25. The process of claim 24 wherein the iron oxide precipitation process comprises contacting the aqueous copper raffinate solution with an aqueous sodium hydroxide solution.

26. The process of claim 25 wherein the aqueous sodium hydroxide solution is provided from the aqueous sodium hydroxide solution produced from the electrochemical reaction.

27. The process of claim 20 wherein (i) the coupled iron oxide precipitation and subsequent solid/liquid separation process is selected for iron (II) concentration and (ii) the iron oxide precipitation process comprises contacting the aqueous copper raffinate solution with an aqueous solution of sodium hydroxide.

28. The process of claim 27 wherein the aqueous sodium hydroxide is provided from the aqueous sodium hydroxide solution produced from the electrochemical reaction.

29. The process of claim 19 further comprising the steps of:
i. Monitoring the ferric nitrate reagent concentration in the heap leaching stage; and
ii. Changing the dosing of the ferric nitrate reagent to the heap leaching stage by providing additional ferric nitrate reagent to the heap leaching stage if the ferric nitrate reagent concentration in the heap leaching stage, as measured through monitoring, is below a level determined to be effective for the heap leaching stage.

30. The process of claim 29 wherein the source of additional ferric nitrate reagent is at least one source selected from the group consisting of ferric nitrate reagent produced from the electrochemical reaction and ferric nitrate regent produced from dissolution of iron metal with nitric acid.

31. The process of claim 19 wherein a source of iron (II) in the aqueous iron (II) solution for the iron mixture comprises acid iron leaching of metallic iron.

32. The process of claim 31 wherein the acid used in the acid iron leaching of metallic iron is at least one acid selected from the group consisting of nitric acid and sulfuric acid.

33. The process of claim 19 wherein a source of iron (II) in the aqueous iron (II) solution for the iron mixture comprises an aqueous iron sulfate solution.

34. A process for producing a ferric nitrate reagent for use in a hydrometallurgical process of copper ore containing iron (II) comprising:
a. Providing an aqueous copper raffinate solution containing iron from a copper organic solvent extraction stage of a copper ore hydrometallurgical process;
b. Concentrating iron (II) in the aqueous copper raffinate solution;
c. Forming an iron mixture comprising the concentrated aqueous iron (II) solution and an acidic aqueous sodium nitrate solution;
d. Feeding the iron mixture to an electrochemical reactor comprising an anode and a cathode and a membrane separating the anode and cathode, wherein an electric charge is applied to the cathode to generate a potential difference between the anode and cathode whereby, through an electrochemical reaction, (i) iron (II) in the iron mixture is oxidized to iron (III) to produce the ferric nitrate reagent, (ii) an aqueous sodium hydroxide solution is produced, and (iii) water is produced;

e. Forming a ferric nitrate mixture comprising the ferric nitrate reagent, sulfuric acid, and the aqueous copper raffinate solution;

f. Diluting the ferric nitrate mixture with at least one diluent selected from the group consisting of water, aqueous copper raffinate solution, and an aqueous copper raffinate solution-water mixture; and g. Dosing the ferric nitrate reagent and sulfuric acid to a copper ore curing stage of a copper ore hydrometallurgical process.

35. The process of claim 34 further comprising:

a. Monitoring the ferric nitrate reagent concentration in the copper ore curing stage; and b. Changing the dosing of the ferric nitrate reagent to the copper ore curing stage by adding ferric nitrate reagent to the copper ore curing stage if the ferric nitrate reagent concentration in the ore curing stage, as measured through monitoring, is below a level determined to be effective for the copper ore curing stage.

36. The process of claim 35 wherein the source for the additional ferric nitrate reagent is at least one source selected from the group consisting of ferric nitrate reagent produced from the electrochemical reaction and ferric nitrate reagent produced from dissolution of iron metal with nitric acid.

37. The process of claim 34 wherein the concentrating of iron (II) in the aqueous copper raffinate solution is performed by one process selected from the group consisting of (i) an organic solvent extraction process and (ii) a coupled iron oxide precipitation and subsequent solid/liquid separation process.

38. The process of claim 37 wherein the organic solvent extraction process is selected for iron (II) concentration, said organic solvent extraction comprised of a first extraction stage to extract iron (II) from the aqueous to organic phase and a second extraction stage to extract iron (II) from the organic to aqueous phase.

39. The process of claim 38 wherein the first extraction stage comprises the extraction of iron (II) from the aqueous to organic phase through the use of di-(2-ethylhexyl) phosphoric acid dissolved in kerosene.

40. The process of claim 38 wherein a discharge stream from the first extraction stage is used in the formation of the ferric nitrate.

41. The process of claim 37 wherein (i) the coupled iron oxide precipitation and subsequent solid/liquid separation process is selected for iron (II) concentration and (ii) the iron oxide precipitation process comprises contacting the aqueous copper raffinate solution with an aqueous solution of sodium hydroxide.

42. The process of claim 41 wherein the aqueous sodium hydroxide solution is provided from the aqueous sodium hydroxide solution produced from the electrochemical reaction.

43. The process of claim 37 wherein (i) the coupled iron oxide precipitation and subsequent solid/liquid separation process is selected for iron (II) concentration and (ii) a stream discharged from the solid/liquid separation process is used in the formation of the ferric nitrate solution.

44. The process of claim 43 wherein the iron oxide precipitation process comprises contacting the aqueous copper raffinate solution with an aqueous copper raffinate solution with an aqueous solution of sodium hydroxide.

45. The process of claim 44 wherein the aqueous sodium hydroxide solution is provided from the aqueous sodium hydroxide solution produced from the electrochemical reaction.

46. The process of claim 34 wherein a source of iron (II) in the aqueous iron (II) solution for the iron mixture comprises acid iron leaching of metallic iron.

47. The process of claim 46 wherein the acid used in the acid iron leaching of metallic iron is at least one acid selected from the group consisting of nitric acid and sulfuric acid.

48. The process of claim 34 wherein a source of iron (II) in the aqueous iron (II) solution for the iron mixture comprises an aqueous iron sulfate solution.

49. A process for producing a ferric nitrate reagent-sulfuric acid mixture for use in a hydrometallurgical process of copper ore containing iron (II) comprising:

a. Providing an aqueous copper raffinate solution containing iron from a copper organic solvent extraction stage of a copper ore hydrometallurgical process;

b. Concentrating iron (II) in the aqueous copper raffinate solution;

c. Forming an iron mixture comprising the concentrated aqueous iron (II) solution and an acidic aqueous sodium nitrate solution;

d. Feeding the iron mixture to an electrochemical reactor comprising an anode and a cathode and a membrane separating the anode and cathode, wherein an electric charge is applied to the cathode to generate a potential difference between the anode and cathode whereby, through an electrochemical reaction, (i) iron (II) in the iron mixture is oxidized to iron (III) to produce the ferric nitrate reagent, (ii) an aqueous sodium hydroxide solution is produced, and (iii) water is produced; and e. Forming a ferric nitrate reagent-sulfuric acid mixture comprising the ferric nitrate reagent and sulfuric acid.

* * * * *